US012767752B2

(12) United States Patent
Lee et al.

(10) Patent No.: US 12,767,752 B2
(45) Date of Patent: Oct. 20, 2026

(54) SELF-HEALING COPOLYMER, FILM HAVING THE SAME, AND METHOD OF PREPARING THE SAME

(71) Applicant: INDUSTRY-ACADEMIC COOPERATION FOUNDATION, DANKOOK UNIVERSITY, Yongin-si (KR)

(72) Inventors: Dong Hyun Lee, Yongin-si (KR); Eun Il Tak, Seongnam-si (KR); Hye Jin Kim, Seoul (KR); Su Min Jung, Seoul (KR)

(73) Assignee: INDUSTRY-ACADEMIC COOPERATION FOUNDATION, DANKOOK UNIVERSITY (KR)

( * ) Notice: Subject to any disclaimer, the term of this patent is extended or adjusted under 35 U.S.C. 154(b) by 613 days.

(21) Appl. No.: 18/485,251

(22) Filed: Oct. 11, 2023

(65) Prior Publication Data

US 2024/0158559 A1 May 16, 2024

(30) Foreign Application Priority Data

Oct. 20, 2022 (KR) ........................ 10-2022-0135677
Mar. 9, 2023 (KR) ........................ 10-2023-0030910

(51) Int. Cl.
*C08F 293/00* (2006.01)
*C08J 5/18* (2006.01)

(52) U.S. Cl.
CPC ............... *C08F 293/00* (2013.01); *C08J 5/18* (2013.01); *C08F 2400/02* (2013.01); *C08J 2353/00* (2013.01)

(58) Field of Classification Search
CPC .................. C08F 293/00; C08F 220/36; C08F 220/1804; C08F 220/14; C08F 220/30;
(Continued)

(56) References Cited

FOREIGN PATENT DOCUMENTS

| | | | | |
|---|---|---|---|---|
| KR | 101372758 B1 * | 3/2014 | .............. | C09D 7/47 |
| KR | 101445089 B1 | 9/2014 | | |

(Continued)

*Primary Examiner* — Mark S Kaucher
(74) *Attorney, Agent, or Firm* — Renaissance IP Law Group LLP

(57) ABSTRACT

The present inventive concept provides a self-healing copolymer or self-healing block copolymer, a method of preparing the same, and a film comprising the same. The self-healing copolymer is a copolymer containing three or more types of monomers such as a methacrylate-based compound as a first monomer, an acrylate-based compound as a second monomer, and] N-2-(phthalimido ethyl methacrylate) (NPEMA), phenyl methacrylate (PMA) or N-(4-hydroxyphenyl)methacrylamide (HPMMA) as a third monomer. The self-healing block copolymer is a block copolymer comprising a self-healing random copolymer containing three or more types of monomers and a styrene-based compound polymerized at the end of the self-healing random copolymer. The film comprising the self-healing copolymer or self-healing block copolymer can self-heal at low temperature or at room temperature in the event of structural damage such as cracks and scratches formed on the surface without the need for additional processes, thereby offering excellent utility in various applications.

15 Claims, 20 Drawing Sheets

(58) Field of Classification Search
CPC ........... C08F 220/58; C08J 5/18; C08L 53/00; C08L 33/08
See application file for complete search history.

(56) References Cited

FOREIGN PATENT DOCUMENTS

| | | | | |
|---|---|---|---|---|
| KR | 101772613 | B1 | 8/2017 | |
| KR | 102115976 | B1 | 5/2020 | |
| WO | WO-2018225166 | A1 * | 12/2018 | ............. C08F 20/12 |

* cited by examiner

SELF-HEALING COPOLYMER, FILM HAVING THE SAME, AND METHOD OF PREPARING THE SAME

CROSS-REFERENCE TO RELATED PATENT APPLICATION

This application claims the benefit of Korean Patent Application No: 10-2022-0135677, filed on Oct. 20, 2022 and Korean Patent Application No: 10-2023-0030910, filed on Mar. 9, 2023, in the Korean Intellectual Property Office, the disclosures of which are incorporated herein in its entirety by reference.

BACKGROUND OF THE INVENTIVE CONCEPT

1. Field of the Inventive Concept

The present inventive concept relates to a self-healing copolymer, and more particularly, to a self-healing copolymer that heals itself in the event of structural damage such as cracks and scratches, a film having the same, and a method of preparing the same.

2. Description of the Related Art

Polymer materials are widely used in various fields such as electrical and electronics, automotive, and medical industries, but their inherent properties may be compromised by physical or chemical external stimuli. When the properties of polymer materials are compromised, the durability and sustainability of products utilizing these materials can be diminished. Especially, in the case of protective materials and portable devices utilizing polymer materials, their durability and lifespan are significantly shortened due to repeated external stress. Moreover, it is difficult to detect minor damage to polymer materials at an early stage, making it impossible or difficult to restore them before their performance deteriorates, and depending on the method used to repair polymer materials, the repaired part may differ from the original, potentially leading to a change in appearance.

As a result, there has recently been a lot of research on "self-healing" polymers, which are inspired by biological tissue and developed to have the ability to autonomously repair damage caused by external physical forces or stimuli. These "self-healing" polymers with the capability of self-restoration can effectively repair minor damage that occurs initially, thus potentially extending the lifespan of polymer materials. Furthermore, depending on the material, there is little or no difference in performance between the original material and the restored material, and thus the self-healing polymers can be used in various applications. For instance, when self-healing polymers are applied to automotive coatings, tiny scratches formed on the surface can self-heal, and when applied to artificial skin materials, wounded areas can heal naturally, like the real skin.

The healing mechanism of self-healing polymer can be broadly divided into two categories: extrinsic self-healing and intrinsic self-healing. The extrinsic self-healing mechanism involves the use of micro/nano capsules into which healing agents are directly introduced, but it is for a single-use with no healing ability after capsule destruction. The intrinsic self-healing mechanism can repeatedly self-heal by means of molecular reversible reactions and bonding such as urea, urethane, Diel-Alder reactions, and multiple hydrogen bonding structures, but its initial properties are weak due to the molecular mobility. Furthermore, in the context of self-healing polymers, the properties of scratch resistance and impact resistance are interchangeable, and when one is improved, the other necessarily tends to deteriorate. In particular, when an impact modifier is used to improve impact resistance, there is a possibility that scratch resistance could be compromised.

Therefore, there is a demand for the development of copolymers that can undergo repetitive self-healing without the need for additional processes, while maintaining excellent mechanical properties suitable for various applications.

REFERENCES OF THE RELATED ART

Patent Documents

Korean Patent No.: 10-1445089 (registered on Sep. 22, 2014)
Korean Patent No.: 10-1772613 (registered on Aug. 23, 2017)
Korean Patent No.: 10-2115976 (registered on May 27, 2020)

SUMMARY

To solve the above-described problems associated with prior art, a first object of the present inventive concept is to provide a synthesized self-healing copolymer with excellent mechanical properties.

A second object of the present inventive concept is to provide a method of preparing the self-healing copolymer of the first object.

A third object of the present inventive concept is to provide a self-healing film prepared having the self-healing copolymer of the first object.

In order to achieve the first object, the present inventive concept provides a self-healing copolymer comprising: a first monomer that is a methacrylate-based compound; a second monomer that is an acrylate-based compound; and a third monomer that is N-2-(phthalimido ethyl methacrylate) (NPEMA), phenyl methacrylate (PMA) or N-(4-hydroxyphenyl)methacrylamide (HPMMA).

Alternatively, in order to achieve the first object, the present inventive concept provides a self-healing block copolymer comprising: a self-healing random copolymer; and a styrene-based compound polymerized at the end of the self-healing random copolymer. The self-healing random copolymer may be a random copolymer comprising: a first monomer that is a methacrylate-based compound; a second monomer that is an acrylate-based compound; and a third monomer that is N-2-(phthalimido ethyl methacrylate) (NPEMA), phenyl methacrylate (PMA) or N-(4-hydroxyphenyl)methacrylamide (HPMMA).

In order to achieve the second object, the present inventive concept provides a method of preparing a self-healing copolymer, comprising the steps of: preparing a first mixed solution containing a methacrylate-based compound and an acrylate-based compound; preparing a second mixed solution by adding a third monomer that is N-2-(phthalimido ethyl methacrylate) (NPEMA), phenyl methacrylate (PMA) or N-(4-hydroxyphenyl)methacrylamide (HPMMA) to the first mixed solution; and preparing a copolymer by adding an initiator to the second mixed solution, followed by heating.

Alternatively, in order to achieve the second object, the present inventive concept provides a method of preparing a self-healing block copolymer: comprising the steps of: preparing a first mixed solution containing a first monomer that is a methacrylate-based compound, a second monomer that is an acrylate-based compound and a third monomer that is N-2-(phthalimido ethyl methacrylate) (NPEMA), phenyl methacrylate (PMA) or N-(4-hydroxyphenyl)methacrylamide (HPMMA); preparing a self-healing random copolymer by stabilizing and copolymerizing the first mixed solution; preparing a second mixed solution containing the self-healing random copolymer and a styrene-based compound; and preparing a self-healing block copolymer containing a styrene-based compound polymerized at the end of the self-healing random copolymer by stabilizing and copolymerizing the second mixed solution.

In order to achieve the third object, the present inventive concept provides a self-healing film prepared using the self-healing copolymer or the self-healing block copolymer. The film can self-heal a scratch at low temperature or at room temperature, specifically at temperatures ranging from 0° C. to 100° C.

The self-healing copolymer of the present inventive concept and the film comprising the same can self-heal a crack or scratch formed on the surface thereof at low temperature without the need for additional processes such as heating or moisture supply. Moreover, the film exhibits excellent mechanical properties and elastic recovery, making it highly versatile for various applications where bending or folding may occur.

BRIEF DESCRIPTION OF THE DRAWINGS

The above and other features and advantages of the present inventive concept will become more apparent by describing in detail exemplary embodiments thereof with reference to the attached drawings in which.

DETAILED DESCRIPTION

Figure 1:
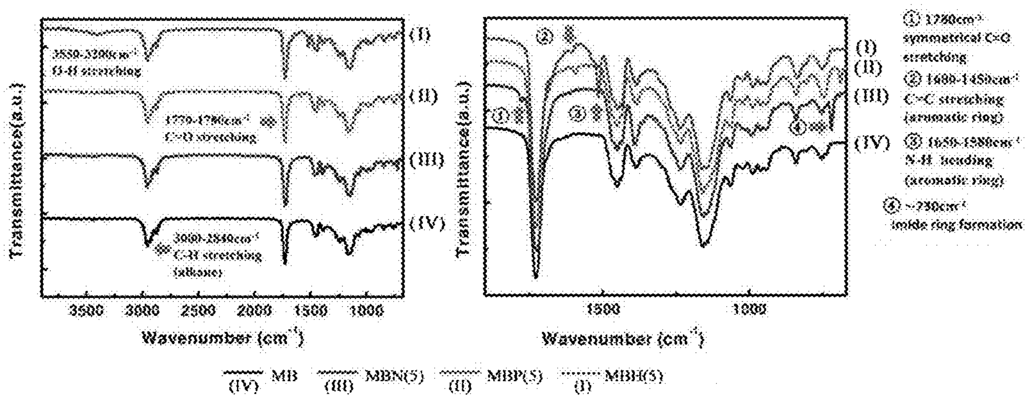
FIG. 1 shows graphs depicting the results of analyzing self-healing copolymers (MB, MBN(5), MBP(5) and MBH(5)) of the present inventive concept by FT-IR spectroscopy.

Hereinafter, preferred embodiments of the present disclosure will be described in detail with reference to the accompanying drawings so that those skilled in the art can easily carry out the present inventive concept. The embodiments of the present inventive concept are provided to more completely describe the inventive concept to those skilled in the art. Thus, the embodiments of the present inventive concept can be modified in various forms, and the scope of the present inventive concept is not limited to the embodiments described below, but can be realized in other forms.

Throughout the entire specification of the present inventive concept, when it is said that a certain part "includes" a certain component, it means that it may further include other components without excluding other components unless otherwise stated.

As used herein, the term "step to" or "step of" does not mean "step for".

The term "self-healing" as used herein refers to intrinsic self-healing capability of a material, where the material itself is reversibly recovered without the addition of other external substances.

The term "monomer" as used herein refers to a molecule that forms the basic unit of a polymer made by polymerization. A polymer with a high molecular weight is prepared through chemical bonding (polymerization) of these monomers.

The term "copolymer" as used herein refers to a polymer consisting of two or more monomers. Polymers with various properties are prepared using monomers having different properties.

The term "glass transition temperature" as used herein refers to the temperature at which an amorphous material transitions from a solid state to a liquid state. At a temperature lower than the glass transition temperature, the amorphous material exhibits glass-like properties, while at a temperature higher than the glass transition temperature, the material exhibits rubber-like properties.

The term "Young's modulus" as used herein refers to a coefficient that indicates how the relative length of an elastic object changes in response to an external force (stress). Regardless of the shape of the object, it is related to the material of the object and is also known as the elastic modulus.

EXAMPLES

The present disclosure provides a self-healing copolymer comprising three or more types of monomers. A methacrylate-based compound may be used as a first monomer, an acrylate-based compound may be used as a second monomer, and N-2-(phthalimido ethyl methacrylate) (NPEMA), phenyl methacrylate (PMA) or N-(4-hydroxyphenyl)methacrylamide (HPMMA) may be used as a third monomer to prepare the self-healing copolymer.

The polymerization of the three types of monomers may be initiated by an initiator to form the self-healing copolymer. Examples of the initiator may include free-radical initiators known in the art, selected from the group consisting of thermal initiators, photoinitiators, polymerization initiators using oxidation-reduction reactions, and mixtures thereof. Specifically, thermal initiators may be used. The thermal initiator may be at least one selected from the group consisting of benzoyl peroxide, acetylperoxide, dilauryl peroxide, di-tert-butyl peroxide, t-butyl peroxy-2-ethylhexanoate, cumyl hydroperoxide, hydrogen peroxide, hydroperoxide, 2,2'-azobis(2-cyanobutane), 2,2'-azobis(methylbutyronitrile), 2,2'-azobis(iso-butyronitrile) (AIBN) and 2,2'-azobisdimethyl-valeronitrile (AMVN), preferably 2,2'-azobis(iso-butyronitrile) (AIBN).

The first monomer may be at least one methacrylate-based compound selected from the group consisting of diethylaminoethyl methacrylate (DEAEMA, DEA), dimethylaminoethyl methacrylate (DMAEMA, DMA), N-isopropylacrylamide (NIPAAm), methyl methacrylate (MMA), and tetrahydrofurfuryl acrylate (THFA), specifically DEAEMA, DMAEMA or MMA, preferably MMA. The first monomer may be used to control the lower critical solution temperature (LCST) and glass transition temperature.

The second monomer may be at least one acrylate-based compound selected from the group consisting of methyl methacrylate (MMA), butyl methacrylate (BMA) and butyl acrylate (BA), preferably BA. The second monomer may be used to control the glass transition temperature, and the glass transition temperature may be controlled by adjusting the alkyl group of the second monomer.

The third monomer, N-2-(phthalimido ethyl methacrylate (NPEMA), may be prepared by mixing 2-hydroxyethyl phthalimide (HEP) and methacryloyl chloride (MC). The HEP may be a HEP solution prepared by dissolving HEP in a mixed solvent containing triethylamine (TEA) and/or methyl ethyl ketone (MEK), and the MC may be an MC solution prepared by dissolving MC in a MEK solvent. Specifically, NPEMA may be prepared by dropping the HEP solution into the MC solution.

The third monomer, phenyl methacrylate (PMA), may be prepared by mixing hydroxybenzene and methacryloyl chloride (MC), and N-(4-hydroxyphenyl)methacrylamide (HPMMA) may be prepared by mixing 4-hydroxyaniline and methacryloyl chloride (MC).

The self-healing copolymer may have a structure represented by one of the following Formulae 1 to 3:

[Formula 1]

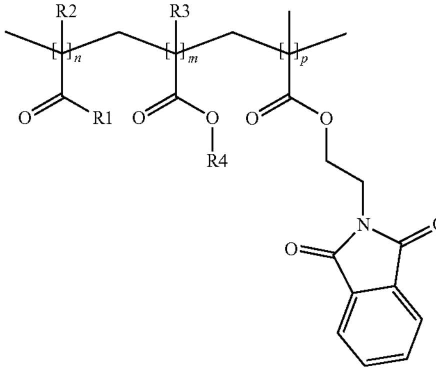

[Formula 2]

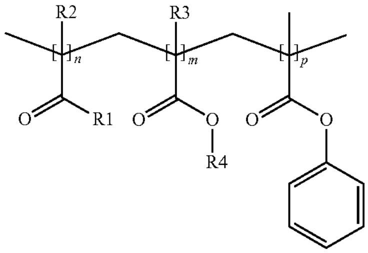

[Formula 3]

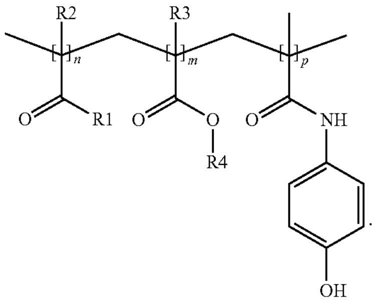

In the above formulae, R1 may be $—OCH_3$,

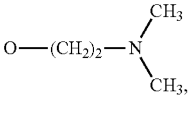

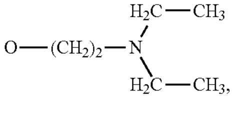

-continued

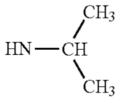

or

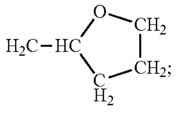

R2 and R3 each may be H or $CH_3$; and R4 may be a methyl group or a butyl group. Specifically, R1 may be —$OCH_3$; R2 may be $CH_3$; R3 may be H; and R4 may be a butyl group. In the above formulae, n+m+p may be 1, where n may be 0.3 to 0.6, m may be 0.4 to 0.7, and p may be 0 to 0.2, specifically 0.01 to 0.15 or 0.05 to 0.1. If p is greater than 0.2, the mechanical properties such as tensile strength and stress of the self-healing copolymer may increase, but the self-healing effect may decrease, and thus p is preferably 0 to 0.2, 0.01 to 0.15, or 0.05 to 0.1.

The self-healing copolymer may have specifically a structure represented by one of the following Formulae 4 to 7:

[Formula 4]

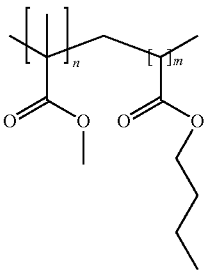

[Formula 5]

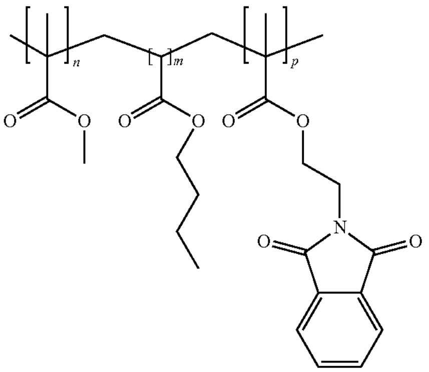

[Formula 6]

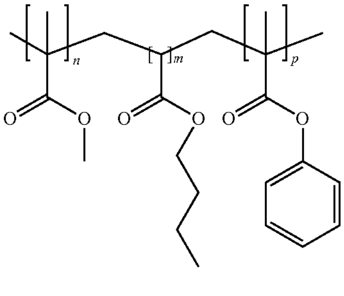

-continued

[Formula 7]

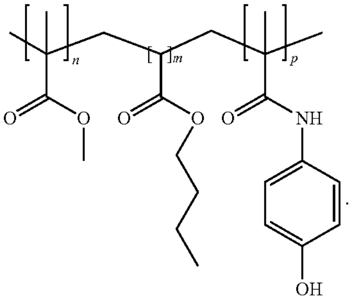

In the above formulae, n+m+p may be 1, where n may be 0.3 to 0.6, m may be 0.4 to 0.7, and p may be 0 to 0.2, specifically 0.01 to 0.15 or 0.05 to 0.1. If p is greater than 0.2, the mechanical properties such as tensile strength and stress of the self-healing copolymer may increase, but the self-healing effect may decrease, and thus p is preferably 0 to 0.2, 0.01 to 0.15, or 0.05 to 0.1.

Moreover, the present inventive concept provides a method of preparing a self-healing copolymer comprising three or more types of monomers. According to the method of preparing the self-healing copolymer, a first mixed solution may be prepared by mixing a first monomer and a second monomer, and a second mixed solution may be prepared by adding a third monomer to the first mixed solution. An initiator may be added to the second mixed solution, followed by heating to prepare the self-healing copolymer.

The first mixed solution may be prepared by mixing a methacrylate-based compound as the first monomer and an acrylate-based compound as the second monomer.

In the above preparation method, the type of methacrylate-based compound, the type of acrylate-based compound, the method for preparing NPEMA, PMA or HPMMA, the structure of the self-healing copolymer, the type of initiator, etc. are the same as those described with respect to the copolymer, their detailed descriptions will be omitted.

The first mixed solution may be prepared by mixing the methacrylate-based compound and the acrylate-based compound in a molar ratio of 3:7 to 6:4, specifically in a molar ratio of 4:6 to 6:4. If the molar ratio of the methacrylate-based compound is less than 3, the glass transition temperature may increase and the fluidity may decrease, leading to a reduced self-healing effect, whereas if the molar ratio is greater than 7, the glass transition temperature decreases, potentially reducing the mechanical properties. Moreover, if the molar ratio of the acrylate-based compound is less than 4, the glass transition temperature may increase and the fluidity may decrease, leading to a reduced self-healing effect, whereas if the molar ratio is greater than 7, the glass transition temperature decreases, potentially reducing the mechanical properties. Therefore, the molar ratio of the methacrylate-based compound to the acrylate-based compound is preferably 3:7 to 6:4.

The molar ratio of the third monomer, NPEMA, PMA or HPMMA, added to the first mixed solution may be 0 to 20 with respect to the total amount 100 of the first mixed solution, specifically 0 to 15, preferably 5 to 10.

If the molar ratio of NPEMA, PMA or HPMMA is 20 or more, the glass transition temperature may increase and the fluidity may decrease, so that self-healing effect may be degraded, and thus the molar ratio of NPEMA, PMA or HPMMA is preferably 0 to 20, 0 to 15, or 5 to 10.

As the initiator added to the second mixed solution, any free-radical initiators known in the art may be used without limitation. The initiator may initiate the polymerization of the first monomer, the second monomer, and the third monomer to prepare the copolymer. The initiator may be added in a molar ratio of 0.05 to 0.1 with respect to the total 100 amount of the second mixed solution. If the molar ratio of the initiator is less than 0.05, the polymerization may not be complete, resulting in inadequate mechanical properties, whereas if the molar ratio is greater than 0.1, over-polymerization may occur, leading to a reduced self-healing effect, and thus the molar ratio of the initiator is preferably 0.05 to 0.1.

According to the method of preparing the self-healing copolymer, the self-healing copolymer may be prepared by adding an initiator to the second mixed solution, followed by heating at a temperature ranging from 65° C. to 90° C. If the reaction temperature is less than 65° C., the polymerization may not be complete, resulting in inadequate mechanical properties, whereas if the temperature is greater than 90° C., overheating may cause explosion or over-polymerization, leading to a reduced self-healing effect, and thus the reaction temperature in the preparation method preferably ranges from 65° C. to 90° C.

Furthermore, the present inventive concept provides a self-healing copolymer film comprising a self-healing copolymer containing three or more types of monomers. The film may be prepared by dissolving the copolymer in a solvent and coating the resulting solution onto a metal sheet or glass substrate, followed by drying.

The solvent that can be used to dissolve the self-healing copolymer to prepare a self-healing copolymer solution may be at least one selected from the group consisting of butyl acetate, chloroform, acetone, methyl ethyl ketone (MEK), benzene, toluene, xylene, N-methylpyrrolidone, N,N-dimethylformamide (DMF), N,N-dimethylacetamide (DMAc), N,N-diethylformamide, N,N-diethylacetamide and mixtures thereof, specifically butyl acetate, but is not limited thereto.

If the metal sheet or glass substrate coated with the self-healing copolymer solution, any metal sheet or glass substrate can be used without limitation, as long as it does not deform the copolymer solution or is not deformed by the copolymer solution. Specifically, the metal sheet may be a copper (Cu) sheet, an aluminum (Al) sheet or a steel plate, preferably a copper sheet. The glass substrate can be used in various forms and types without any specific limitations, based on the need, use or performance. Methods for coating the copolymer solution onto the metal sheet or glass substrate may include spin-coating, gravure coating, bar-coating, slit coating, spray coating, and molding. A specific method is the spin coating, but is not limited thereto.

The drying of the metal sheet or glass substrate coated with the copolymer solution is preferably carried out at a temperature equal to or higher than the boiling point of the solvent used to dissolve the self-healing copolymer or at a temperature higher than the curing reaction temperature, and specifically at a temperature ranging from 120° C. to 250° C. If the drying temperature is less than 120° C., the removal of organic solvents may take longer and result in inefficiency, whereas if the drying temperature is greater than 250° C., there is a possibility of film degradation, and thus it is desirable to dry the coated self-healing copolymer solution at a temperature ranging from 120° C. to 250° C. to prepare the film. The film formed after drying may have a thickness of 10 μm to 40 μm, specifically 10 μm to 30 μm, preferably 15 μm to 25 μm, but is not limited thereto.

The self-healing copolymer film comprising the self-healing copolymer may exhibit excellent mechanical properties and chemical stability even without crosslinking of the copolymer.

The self-healing copolymer film can self-heal a scratch at low temperature or at room temperature or at a temperature ranging from 0° C. to 75° C., specifically at a temperature ranging from 24° C. to 75° C., without the need for additional processes such as heating or moisture supply.

The self-healing copolymer film may exhibit elastic recovery, and specifically it can have elastic recovery at low temperature or at room temperature. The elastic recovery can prevent the occurrence of lifting even during bending, folding, etc., thereby offering excellent utility in various applications.

In addition, the present inventive concept provides a self-healing block copolymer comprising: a self-healing random copolymer comprising three or more types of monomers; and a styrene-based compound polymerized at the end of the self-healing random copolymer. The self-healing random copolymer may be a random copolymer comprising: a first monomer that is a methacrylate-based compound; a second monomer that is an acrylate-based compound; and a third monomer that is N-2-(phthalimido ethyl methacrylate) (NPEMA), phenyl methacrylate (PMA) or N-(4-hydroxyphenyl)methacrylamide (HPMMA).

The first monomer of the self-healing random copolymer may be at least one methacrylate-based compound selected from the group consisting of diethylaminoethyl methacrylate (DEAEMA, DEA), dimethylaminoethyl methacrylate (DMAEMA, DMA), N-isopropylacrylamide (NIPAAm), methyl methacrylate (MMA), ethyl methacrylate, propyl methacrylate, butyl methacrylate and cyclohexyl methacrylate, preferably DEAEMA, DMAEMA, MMA or ethyl methacrylate. The first monomer may also be used to control the glass transition temperature.

The second monomer of the self-healing random copolymer may be at least one acrylate-based compound selected from the group consisting of methyl methacrylate (MMA), ethyl methacrylate, propyl methacrylate, butyl methacrylate (BMA), methyl acrylate, ethyl acrylate, propyl acrylate and butyl acrylate (BA), preferably BMA or BA. The second monomer may also be used to control the glass transition temperature, and the glass transition temperature may be controlled by adjusting the alkyl group of the second monomer.

The third monomer of the self-healing random copolymer, N-2-(phthalimido ethyl methacrylate) (NPEMA), phenyl methacrylate (PMA) or N-(4-hydroxyphenyl) methacrylamide (HPMMA), can be used for self-healing effects and modulation of mechanical properties.

The styrene-based compound polymerized at the end of the self-healing random copolymer may be at least one selected from the group consisting of styrene, methyl styrene, ethyl styrene, propyl styrene, butyl styrene, and halogenated styrene, preferably styrene, methyl styrene or halogenated styrene. The halogenated styrene may be at least one selected from the group consisting of bromo styrene, dibromo styrene, tribromo styrene, chloro styrene, dichloro styrene, trichloro styrene, fluoro styrene, difluoro styrene, and trifluoro styrene.

The styrene-based compound polymerized at the end of the self-healing random copolymer may be used to form a block copolymer for self-healing effects and modulation of mechanical properties. Moreover, the mechanical properties may be increased by the amount of the styrene-based compound added, but the self-healing effect may be reduced, and thus the amount may be adjusted based on the intended use.

The self-healing block copolymer may have a structure represented by one of the following Formulae 8 to 10:

[Formula 8]

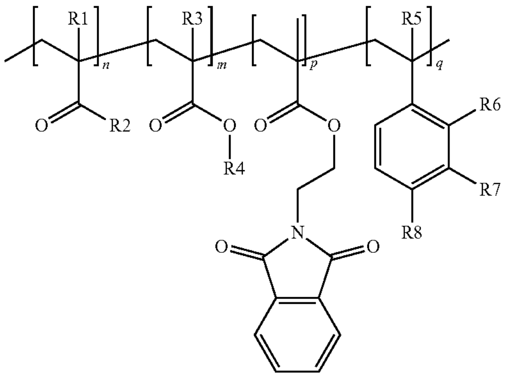

[Formula 9]

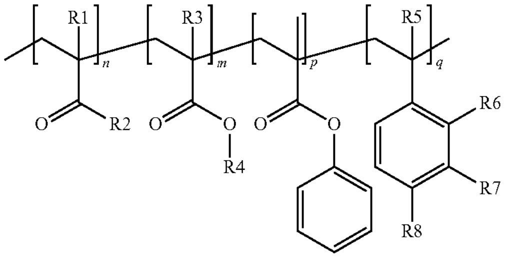

[Formula 10]

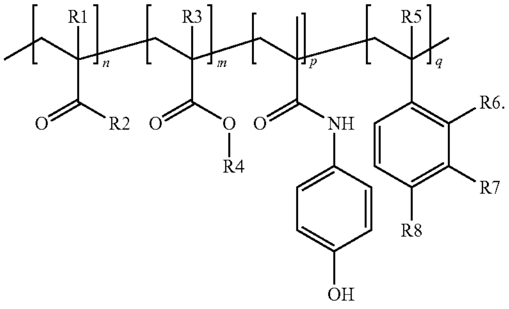

In the above formulae, R1 and R3 may be hydrogen (H) or a methyl group ($CH_3$); R2 may be

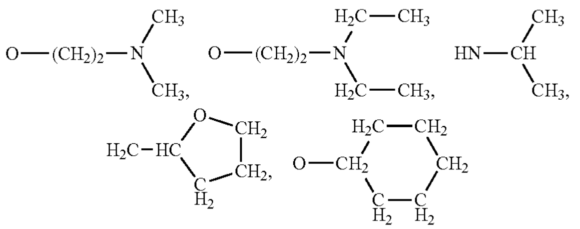

or an alkoxy group having a carbon number of $C_1$ to $C_4$; R4 may be a methyl group, an ethyl group, an n-propyl group, an isopropyl group, or an n-butyl group; and R5 to R8 each may be hydrogen, a methyl group, an ethyl group, an n-butyl group, an isobutyl group, a sec-butyl group, a tert-butyl group, bromine (Br), or chlorine (Cl). In the above formulae, the sum of n, m, p and q may be 1, where n may be 0.2 to 0.5, specifically 0.25 to 0.5, preferably 0.25 to 0.45, and m may be 0.2 to 0.6, specifically 0.21 to 0.6, preferably 0.25 to 0.6. In the above formulae, p may be 0.01 to 0.2, specifically 0.015 to 0.2, preferably 0.015 to 0.1, and q may be 0.1 to 0.5, specifically 0.15 to 0.46, preferably 0.2 to 0.45.

Moreover, the self-healing block copolymer may have specifically a structure represented by one of by the following Formulae 11 to 13:

[Formula 11]

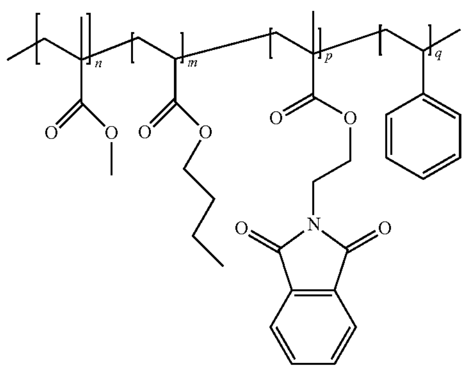

[Formula 12]

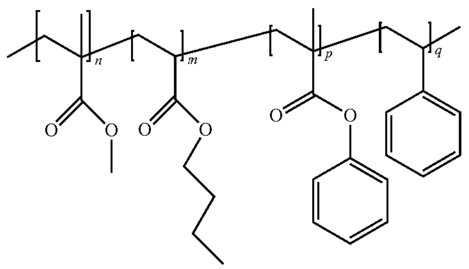

[Formula 13]

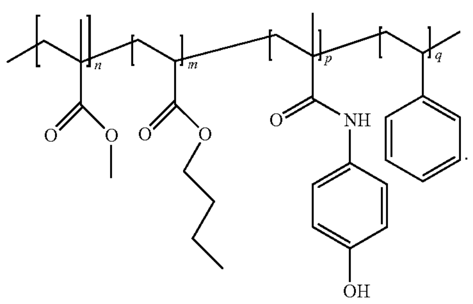

In the above formulae, the sum of n, m, p and q may be 1, where n may be 0.2 to 0.5, specifically 0.25 to 0.5, preferably 0.25 to 0.45, and m may be 0.2 to 0.6, specifically 0.21 to 0.6, preferably 0.25 to 0.6. In the above formulae, p may be 0.01 to 0.2, specifically 0.015 to 0.2, preferably 0.015 to 0.1, and q may be 0.1 to 0.5, specifically 0.15 to 0.46, preferably 0.2 to 0.45.

In the above Formulae 8 to 13, if q is less than 0.1, the self-healing effect of the self-healing block copolymer may increase, but the mechanical properties such as tensile strength, Young's modulus, elongation and stress, as well as and flexibility may decrease. Furthermore, in the above Formulae 8 to 13, if q is greater than 0.5, the mechanical properties such as tensile strength, Young's modulus, elongation and stress, as well as and flexibility, of the self-healing block copolymer may increase, but the self-healing effect may decreases. Therefore, in the above Formulae 8 to 13, q is preferably 0.1 to 0.5.

The self-healing block copolymer may have a glass transition temperature of 10° C. or more, specifically range from 10° C. to 30° C., preferably range from 10° C. to 25° C. If the glass transition temperature of the self-healing block copolymer is less than 10° C., the mechanical properties such as tensile strength, Young's modulus, elongation and stress at room temperature may be poor, making it susceptible to damage, whereas if it is greater than 30° C., the self-healing effect may not appear. Therefore, the glass transition temperature of the self-healing block copolymer may preferably be 10° C. or higher. In addition, the glass transition temperature of the self-healing block copolymer may be increased by the styrene-based compound polymerized at the end of the self-healing random copolymer.

Moreover, the present inventive concept provides a method of preparing a self-healing block copolymer comprising: a self-healing random copolymer; and a styrene-based compound polymerized at the end of the self-healing random copolymer. The method of preparing the self-healing block copolymer may comprise the steps of preparing a first mixed solution containing a first monomer that is a methacrylate-based compound, a second monomer that is an acrylate-based compound and a third monomer that is N-2-(phthalimido ethyl methacrylate) (NPEMA), phenyl methacrylate (PMA) or N-(4-hydroxyphenyl)methacrylamide (HPMMA); and preparing a self-healing random copolymer by stabilizing and copolymerizing the first mixed solution. The self-healing block copolymer may be prepared by preparing a second mixed solution containing the self-healing random copolymer and a styrene-based compound, and stabilizing and copolymerizing the second mixed solution.

The first mixed solution may be prepared by mixing the first monomer, the second monomer, and the third monomer in a solvent. The solvent may be at least one selected from the group consisting of butyl acetate, chloroform, acetone, methyl ethyl ketone, benzene, toluene, xylene, N-methylpyrrolidone, N,N-dimethylformamide, N,N-Dimethylacetamide, N,N-diethylformamide, N,N-diethylacetamide, anisole and mixtures thereof, specifically butyl acetate or anisole, but is not limited thereto.

The first mixed solution may comprise 20 wt % to 60 wt % of the methacrylate-based compound as the first monomer, 30 wt % to 70 wt % of the acrylate-based compound as the second monomer, and 1 wt % to 20 wt % of NPEMA, PMA or HPMMA as the third monomer. The first mixed solution may be prepared by adding the third monomer to a solvent in which the first monomer and the second monomer are dissolved. If the amount of the methacrylate-based compound as the first monomer in the first mixed solution is less than 20 wt % by weight, the self-healing effect may decrease due to an increase in glass transition temperature and a decrease in fluidity, whereas if it is greater than 60 wt %, the mechanical properties may decrease due to a decrease in glass transition temperature. If the content of the acrylate-based compound as the second monomer in the first mixed solution is less than 30 wt %, the self-healing effect may decrease due to an increase in glass transition temperature and a decrease in fluidity, whereas if it is greater than 70 wt %, the mechanical properties may decrease due to a decrease in glass transition temperature. If the content of NPEMA, PMA or HPMMA as the third monomer in the mixed solution is less than 10 wt %, the mechanical properties may decrease due to a decrease in glass transition temperature, whereas if it is greater than 15 wt %, the self-healing effect may decrease due to an increase in glass transition temperature and a decrease in fluidity.

The third monomer, NPEMA, may be prepared by mixing 2-hydroxyethyl phthalimide (HEP) and methacryloyl chloride (MC). The HEP may be a HEP solution prepared by dissolving HEP in a mixed solvent containing triethylamine (TEA) and/or methyl ethyl ketone (MEK), and the MC may be an MC solution prepared by dissolving MC in a MEK solvent. Specifically, NPEMA may be prepared by dropping the HEP solution into the MC solution.

In the step of preparing the self-healing random copolymer, the first mixed solution may be stabilized by adding an initiator, a catalyst, and a ligand, followed by purging with nitrogen ($N_2$) gas. Specifically, it may be stabilized by purging with nitrogen gas for 20 to 50 minutes, preferably by purging with nitrogen gas at a temperature ranging from 40° C. to 60° C. for 20 to 50 minutes. As the initiator added to the first mixed solution, any free-radical initiators known in the art may be used without limitation. The initiator may initiate the polymerization of the first mixed solution to prepare the self-healing random copolymer. The initiator may be a thermal initiator that is a free-radical initiator, preferably 2,2'-azobis(iso-butyronitrile) (AIBN). The catalyst added to the first mixed solution may be a transition metal or a transition metal salt, specifically at least one transition metal or a transition metal salt selected from the group consisting of Ti, Mo, Re, Fe, Ru, Os, Rh, Co, Ni, Pd and Cu, preferably a Cu catalyst, but is not limited thereto. The Cu catalyst may be at least one selected from the group consisting of CuBr, CuCl, $CuCl_2$, $CuBr_2$ and Cu(0), preferably CuBr, but is not limited thereto. The ligand added to the first mixed solution may be at least one selected from the group consisting of 1,1,4,7,7-pentamethyldiethylenetriamine (PMDETA), 1,1,4,7,10,10-Hexamethyltriethylenetetramine (HMTETA), 2,2'-bipyridyl (bpy), 4,4'-dimethyl-2,2'-dipyridyl (DMDP), tris(2-pyridylmethyl)amine (TPMA), tris(2-aminoethyl)amine (TAEA) and tris(2-dimethylaminoethyl)amine (Me6TREN), specifically PMDETA, HMTETA or 2,2'-bipyridyl, preferably PMDETA, but is not limited thereto.

The stabilized first mixed solution may be copolymerized by heating at a temperature ranging from 50° C. to 100° C., specifically at a temperature ranging from 50° C. to 90° C. If the reaction temperature is less than 50° C., the polymerization may not be complete, resulting in inadequate mechanical properties, whereas if the reaction temperature is greater than 100° C., overheating may cause explosion or over-polymerization, leading to a reduced self-healing effect, and thus the reaction temperature preferably ranges from 50° C. to 100° C. The copolymerized first mixed solution may be precipitated in an excess of hexane to prepare the self-healing random copolymer.

The second mixed solution may be prepared by mixing the self-healing random copolymer and the styrene-based compound in a solvent. The amount of the styrene-based compound contained in the second mixed solution may be 65 wt % or less with respect to the total weight of the first mixed solution containing the self-healing random copolymer, specifically 5 wt % to 65 wt %, preferably 10 wt % to 65 wt %. The solvent may be the same as or different from the first mixed solution, and specifically, it may be at least one selected from the group consisting of butyl acetate, chloroform, acetone, methyl ethyl ketone, benzene, toluene, xylene, N-methylpyrrolidone, N,N-diethylformamide, N,N-diethylacetamide, anisole, and mixtures thereof, preferably butyl acetate or anisole, but is not limited thereto.

In the step of preparing the self-healing block copolymer, the second mixed solution may be stabilized by adding a catalyst and a ligand, followed by purging with nitrogen ($N_2$) gas. Specifically, it may be stabilized by purging with nitrogen gas for 20 to 50 minutes, preferably by purging with nitrogen gas at a temperature ranging from 40° C. to 60° C. for 20 to 50 minutes. The catalyst and the ligand added to the second mixed solution may be the same as or different from those added to the first mixed solution. The catalyst added to the second mixed solution may be a transition metal or a transition metal salt, specifically at least one transition metal or a transition metal salt selected from the group consisting of Ti, Mo, Re, Fe, Ru, Os, Rh, Co, Ni, Pd, and Cu, preferably a Cu catalyst, but is not limited thereto. The Cu catalyst may be at least one selected from the group consisting of CuBr, CuCl, $CuCl_2$, $CuBr_2$ and Cu(0), preferably CuBr, but is not limited thereto. The ligand added to the second mixed solution may be at least one selected from the group consisting of 1,1,4,7,7-pentamethyldiethylenetriamine (PMDETA), 1,1,4,7,10,10-Hexamethyltriethylenetetramine (HMTETA), 2,2'-bipyridyl (bpy), 4,4'-dimethyl-2,2'-dipyridyl (DMDP), tris(2-pyridylmethyl)amine (TPMA), tris(2-aminoethyl)amine (TAEA) and tris(2-dimethylaminoethyl)amine (Me6TREN), specifically PMDETA, HMTETA or 2,2'-bipyridyl, preferably PMDETA, but is not limited thereto.

Furthermore, in the step of preparing the self-healing block copolymer, the initiator may not be added, and instead, the self-healing random copolymer may act as the initiator.

The stabilized second mixed solution may be copolymerized by heating at a temperature ranging from 60° C. to 120° C., specifically at a temperature ranging from 70° C. to 120° C. If the reaction temperature is less than 60° C., the polymerization may not be complete, resulting in inadequate mechanical properties, whereas if the reaction temperature is greater than 120° C., overheating may cause explosion or over-polymerization, leading to a reduced self-healing effect, and thus the reaction temperature preferably ranges from 60° C. to 120° C. The copolymerized second mixed solution may be precipitated in an excess of hexane to prepare the self-healing block copolymer.

In the above preparation method, the type of methacrylate-based compound as the first monomer, the type of acrylate-based compound as the second monomer, the type of styrene-based compound, and the structure of the prepared self-healing block copolymer are the same as those described with respect to the self-healing block copolymer, their detailed descriptions will be omitted.

Furthermore, the present inventive concept provides a film comprising: a self-healing random copolymer; and a self-healing block copolymer containing a styrene-based compound polymerized at the end of the self-healing random copolymer. The film may be prepared by dissolving the self-healing block copolymer in a solvent and coating the resulting solution onto a metal sheet or glass substrate, followed by drying.

The types and molar ratios of the first monomer, the second monomer and the third monomer contained in the self-healing random copolymer included in the film, the type of styrene-based compound polymerized at the end of the self-healing random copolymer, and the properties and structure of the self-healing block copolymer included in the film are the same as those described with respect to the self-healing block copolymer, their detailed descriptions will be omitted.

The solvent used to dissolve the self-healing block copolymer may be at least one selected from the group consisting of butyl acetate, chloroform, acetone, methyl ethyl ketone, benzene, toluene, xylene, N-methylpyrrolidone, N,N-dimethylformamide (DMF), N,N-dimethylacetamide (DMAc), N,N-diethylformamide, N,N-diethylacetamide, anisole, and mixtures thereof, specifically butyl acetate or anisole, but is not limited thereto.

If the metal sheet or glass substrate is coated with the solution containing the self-healing block copolymer, any metal sheet or glass substrate can be used without limitation, as long as it does not deform the solution or is not deformed by the solution.

Specifically, the metal sheet may be a copper (Cu) sheet, an aluminum (Al) sheet or a steel plate, preferably a copper sheet. The glass substrate can be used in various forms and types without any specific limitations, based on the need, use or performance. Methods for coating the copolymer solution onto the metal sheet or glass substrate may include spin-coating, gravure coating, bar-coating, slit coating, spray coating, and molding. A specific method is the spin coating, but is not limited thereto.

The drying of the copolymer solution coated onto the metal sheet or glass substrate may be carried out at a temperature equal to or higher than the boiling point of the solvent used to dissolve the self-healing copolymer, without deforming the metal sheet or glass substrate coated with the solution, specifically at a temperature ranging from 120° C. to 250° C., preferably at a temperature ranging from 125° C. to 230° C. If the drying temperature is less than 120° C., the removal of organic solvents may take longer and result in inefficiency, whereas if the drying temperature is greater than 250° C., there is a possibility of film degradation, and thus the drying temperature preferably ranges from 120° C. to 250° C.

The film formed on the metal sheet or glass substrate after drying may have a thickness of 10 μm to 40 μm, specifically 10 μm to 30 μm, preferably 15 μm to 25 μm, but is not limited thereto.

The self-healing block copolymer film comprising the self-healing block copolymer can self-heal a crack or scratch at a low temperature, specifically at a temperature ranging from 40° C. to 100° C., preferably, at a temperature ranging from 50° C. to 100° C. Moreover, the self-healing block copolymer film can self-heal without the need for additional processes such as heating or moisture supply. Moreover, the self-healing block copolymer film may exhibit excellent mechanical properties and chemical stability even without crosslinking of the copolymer.

The self-healing block copolymer film may exhibit elastic recovery, and specifically it can have elastic recovery at low temperature, preferably at a temperature ranging from 14° C. to 100° C. The elastic recovery can prevent the occurrence of lifting even during bending, folding, etc., thereby offering excellent utility in various applications.

The self-healing block copolymer film may have a tensile strength of 70 MPa to 350 MPa. If the tensile strength is less than 70 MPa, the mechanical properties may be poor, making it susceptible to damage, whereas if it is greater than 350 MPa, the lack of flexibility may limit its applications.

The self-healing block copolymer film may have a Young's modulus of 1,500 MPa to 20,000 MPa at room temperature, specifically 1,800 MPa to 20,000 MPa, preferably 2,000 MPa to 18,000 MPa. If the Young's modulus is less than 1,500 MPa, the mechanical properties may be poor, making it difficult to handle, whereas if the Young's modulus is greater than 20,000 MPa, the self-healing block copolymer film may not be easily stretched, bent or folded, which may limit its applications. The room temperature may range from 15° C. to 25° C.

Hereinafter, the present inventive concept will be described in detail with respect to the following Preparation Examples, Experimental Examples and Comparative Examples.

Preparation Example 1: Preparation of Third Monomer 1-1. Preparation of N-2-(phthalimido ethyl methacrylate) (NPEMA)

A HEP solution was prepared by dissolving 10 g of 2-hydroxyethyl phthalimide (HEP) in a solvent mixture of triethylamine (TEA) and methyl ethyl ketone (MEK).

NPEMA was prepared by dropping MEK and 5.59 ml of methacryloyl chloride (MC) into the HEP solution while stirring and cooling.

Preparation Example 2: Preparation of Self-Healing Copolymers 2-1. Preparation of MMA (methyl methacrylate)-BA (butyl acrylate)-NPEMA Copolymers A first mixed solution of 76.90 mmol of MMA and BA with a molar ratio of 45:55 was prepared, and then a solution prepared by dissolving 3.845 mmol or 7.69 mmol of NPEMA, which was prepared in Preparation Example 1-1, in a dioxane solvent was added to the first mixed solution to prepare a second mixed solution.

To the second mixed solution, 0.26 mmol of AIBN (thermal initiator) was added, and the mixture was purged with nitrogen for 30 minutes and then reacted at 80° C. for 16 hours. The resulting mixture was cooled to terminate the reaction, and then precipitated in an excess of hexane to prepare $MMA_{-co-}BA_{-co-}NPEMA$ copolymers (MBN(5) and MBN(10)).

2-2. Preparation of MMA-BA-PMA Copolymers $MMA_{-co-}BA_{-co-}PMA$ copolymers (MBP(5) and MBP (10)) were prepared in the same method as described in Preparation Example <2-1> except that Phenyl methacrylate (PMA) instead of NPEMA was used.

2-3. Preparation of MMA-BA-HPMAA Copolymers $MMA_{-co-}BA_{-co-}HPMAA$ copolymers (MBH(5) and MBH (10)) were prepared in the same manner as in Preparation Example 2-1, except that N-(4-hydroxyphenyl) methacrylamide (HPMAA) was used instead of NPEMA.

2-4. Preparation of MMA-BA Copolymers

To the first mixed solution of Preparation Example 2-1, 0.26 mmol of AIBN (thermal initiator) was added, and the mixture was purged with nitrogen for 30 minutes and then reacted at 80° C. for 16 hours. The resulting mixture was cooled to terminate the reaction, and then precipitated in an excess of hexane to prepare $MMA_{-co-}BA$ copolymers (MB (5) and MB(10)).

Preparation Example 3: Preparation of Self-Healing Block Copolymers 3-1. Preparation of Self-Healing Random Copolymer A first mixed solution was prepared by dissolving 14.41 ml (135.35 mmol) of methyl methacrylate (MMA), 24.14 ml (167.65 mmol) of butyl acrylate (BA) and 1.1996 g (4.61 mmol) of NPEMA prepared in Preparation Example 1-1 in 30 ml of anisole solvent.

To the first mixed solution, 1.025 mmol of eBiB (0.20 g, initiator), CuBr (I) (0.15 g, catalyst) and PMDETA (0.18 g, ligand) were added, and the mixture was purged with nitrogen for 30 minutes to stabilize the first mixed solution. The stabilized first mixture solution was then reacted at 70° C. for 24 hours and subsequently cooled to terminate the reaction. Then, the first mixed solution was precipitated in an excess of hexane to prepare a self-healing random copolymer MMA-r-BA-r-NPEMA (MBN(r).

3-2. Preparation of MBN-b-PS 1 Self-Healing Block Copolymer

The MMA-r-BA-r-NPEMA self-healing random copolymer (MBN(r)) prepared in Preparation Example 3-1 and styrene were copolymerized to prepare a self-healing block copolymer.

Specifically, 1 g (0.027 mmol) of MMA-r-BA-r-NPEMA self-healing random copolymer (MBN(r)) and 4.73 ml (0.04 mol) of styrene were dissolved in 5.03 ml of anisole solvent to prepare a second mixed solution.

To the second mixed solution, 0.05 mmol of CuBr (I) (0.15 g, catalyst) and PMDETA (0.0071 g, ligand) were added, and the mixture was purged with nitrogen for 30 minutes to stabilize the second mixed solution. The stabilized second mixture solution was then reacted at 100° C. for 3 hours and subsequently cooled to terminate the reaction. Then, the second mixed solution was precipitated in an excess of hexane to prepare an MBN-b-PS 1 self-healing block copolymer comprising the self-healing random copolymer and copolymerized styrene.

3-3. Preparation of MBN-b-PS 2 Self-Healing Block Copolymer

An MBN-b-PS 2 self-healing block copolymer was prepared in the same manner as in Preparation Example 3-2, except that 12.7 ml (0.11 mol) of styrene was used instead of 4.73 ml (0.04 mol) of styrene.

Preparation Example 4: Preparation of Self-Healing Copolymer Films 4-1. Preparation of Film (F-MBN) Using MMA-BA-NPEMA Copolymer The MMA-BA-NPEMA copolymer prepared in Preparation Example 2-1 was dissolved in toluene solvent to prepare a 30 wt % MBN solution, which was then coated onto a glass substrate by bar coating. The glass substrate coated with the MBN solution was dried at 80° C. for 1 hour to prepare an MMA-BA-NPEMA copolymer film (F-MBN) having a thickness of 20 μm.

4-2. Preparation of Film (F-MBP) Using MMA-BA-PMA Copolymer

An MMA-BA-PMA copolymer film (F-MBP) having a thickness of 20 μm was prepared in the same manner as in Preparation Example 4-1, except that the MMA-BA-PMA copolymer prepared in Preparation Example 2-2 was used instead of the copolymer prepared in Preparation Example 2-1.

4-3. Preparation of Film (F-MBH) Using MMA-BA-HPMAA Copolymer

An MMA-BA-HPMMA copolymer film (F-MBH) having a thickness of 20 μm was prepared in the same manner as in Preparation Example 4-1, except that the MMA-BA-HPMMA copolymer prepared in Preparation Example 2-3 was used instead of the copolymer prepared in Preparation Example 2-1.

4-4. Preparation of Film (F-MB) Using MMA-BA Copolymer

An MMA-BA copolymer film (F-MB) having a thickness of 20 μm was prepared in the same manner as in Preparation Example 4-1, except that the MMA-BA copolymer prepared in Preparation Example 2-4 was used instead of the copolymer prepared in Preparation Example 2-1.

Preparation Example 5: Preparation of Self-Healing Block Copolymer Films 5-1. Preparation of Film (F-MBN-b-PS 1) Using MBN-b-PS 1 Copolymer The MBN-b-PS 1 self-healing block copolymer prepared in Preparation Example 3-2 was dissolved in toluene solvent to prepare a 30 wt % MBN-b-PS 1 solution, which was then coated onto a glass substrate by bar coating. The glass substrate coated with the MBN-b-PS 1 solution was dried at 80° C. for 1 hour to prepare an MBN-b-PS 1 copolymer film (F-MBN-b-PS 1) having a thickness of 20 μm.

5-2. Preparation of Film (F-MBN-b-PS 2) Using MBN-b-PS 2 Copolymer

An MBN-b-PS 2 copolymer film (F-MBN-b-PS 2) having a thickness of 20 μm was prepared in the same manner as in Preparation Example 5-1, except that the MBN-b-PS 2 copolymer prepared in Preparation Example 3-3 was used instead of the MBN-b-PS 1 copolymer prepared in Preparation Example 3-2.

Comparative Example 1: Preparation of Film (F-MBN) Using Self-Healing Random Copolymer (MBN(r))

The MMA-r-BA-r-NPEMA self-healing random copolymer (MBN(r)) prepared in Preparation Example 3-1 was dissolved in toluene solvent to prepare a 30 wt % MBN(r) solution, which was then coated onto a glass substrate by bar coating. The coated glass substrate was dried at 80° C. for 1 hour to prepare an MMA-r-BA-r-NPEMA self-healing random copolymer film (F-MBN(r)) having a thickness of 20 μm.

Experimental Example 1: Identification of Structures of Self-Healing Copolymer and Self-Healing Block Copolymer The structures and physical properties of the self-healing copolymer of Preparation Example 2 and the self-healing block copolymer of Preparation Example 3 were analyzed.

Referring to FIG. 1, the results of FT-IR analysis on the self-healing copolymer prepared in Preparation Example 2 revealed: (1) the presence of C═O bonds in MBN(5) by peak analysis; (2) the presence of aromatic C═O bonds MBH(5) by peak analysis; (3) the presence of aromatic N-H bonds MBH(5) by peak analysis; and (4) the presence of imide rings MBN(5) by peak analysis.

Figure 2A:
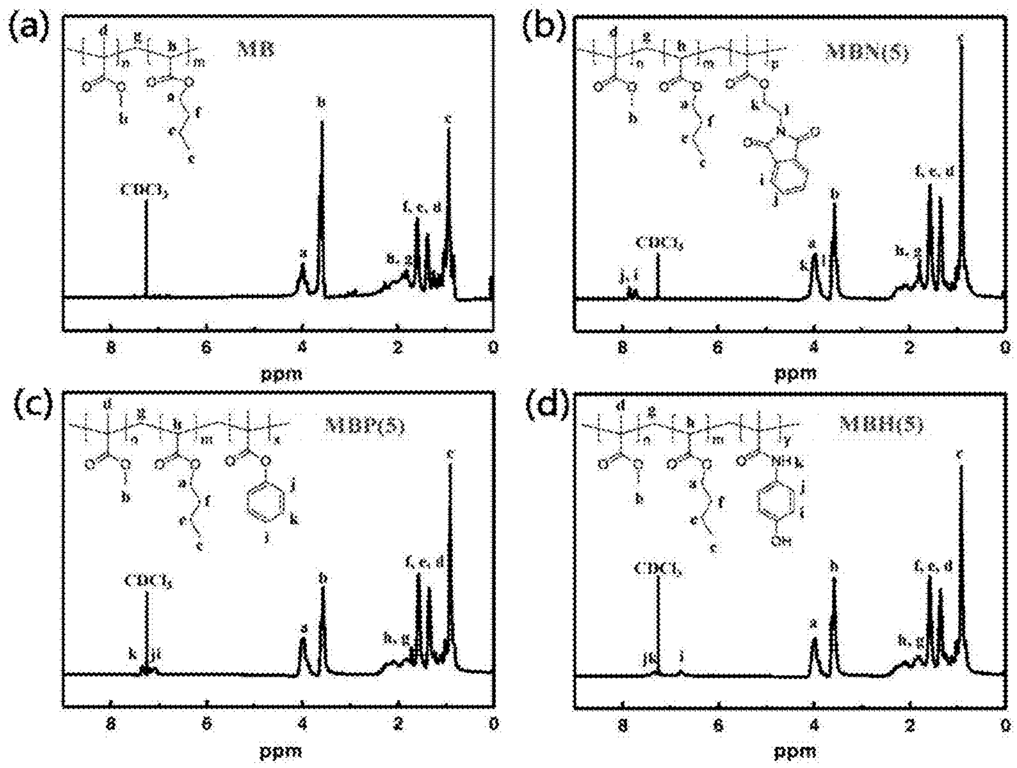
FIGS. 2A-2D show graphs depicting the results of analyzing self-healing copolymers (MB, MBN(5), MBP(5) and MBH(5)) and self-healing block copolymers (MBN-b-PS 1 and MBN-b-PS 2) of the present inventive concept by $^{1}$H-NMR spectroscopy.

Referring to FIG. 2A, the results of $^1$H-NMR analysis on the self-healing copolymer prepared in Preparation Example 2 indicated that peaks a to h, representing the presence of the first monomer and the second monomer, were all present in FIG. 2A (a) to (d). Moreover, it was found that peaks i to k, representing the third monomers having different structures, were distinct peaks. Therefore, based on the results of FT-IR and $^1$H-NMR analysis, it was found that the self-healing copolymers prepared in Preparation Examples 2-1 to 2-4 were produced in the desired forms.

Figure 2B:
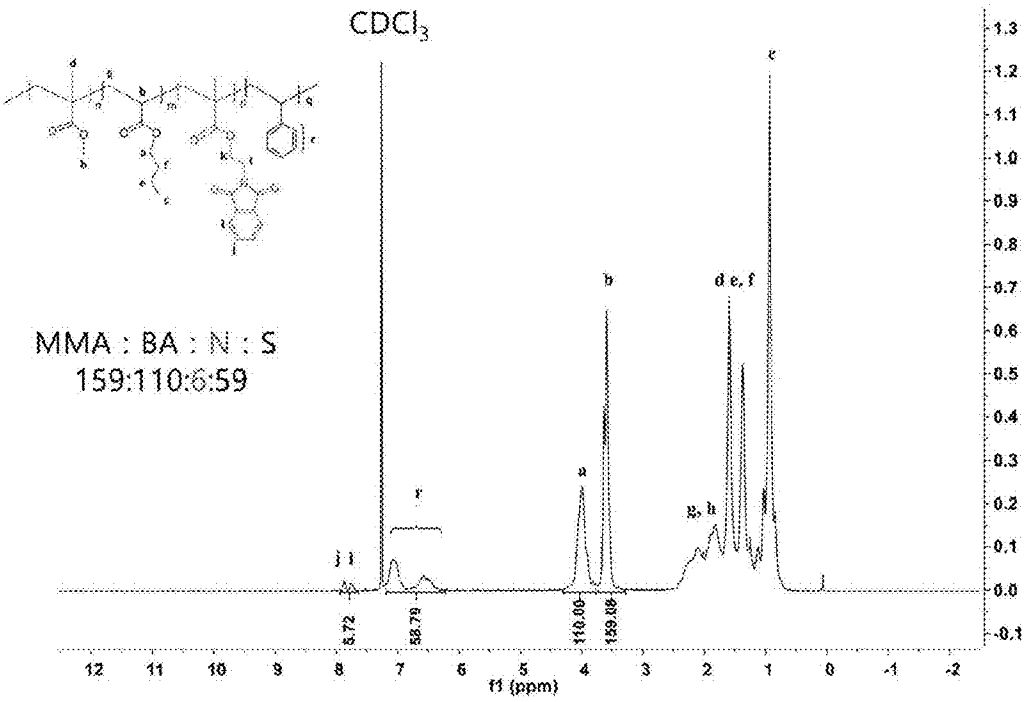
Figure 2C:
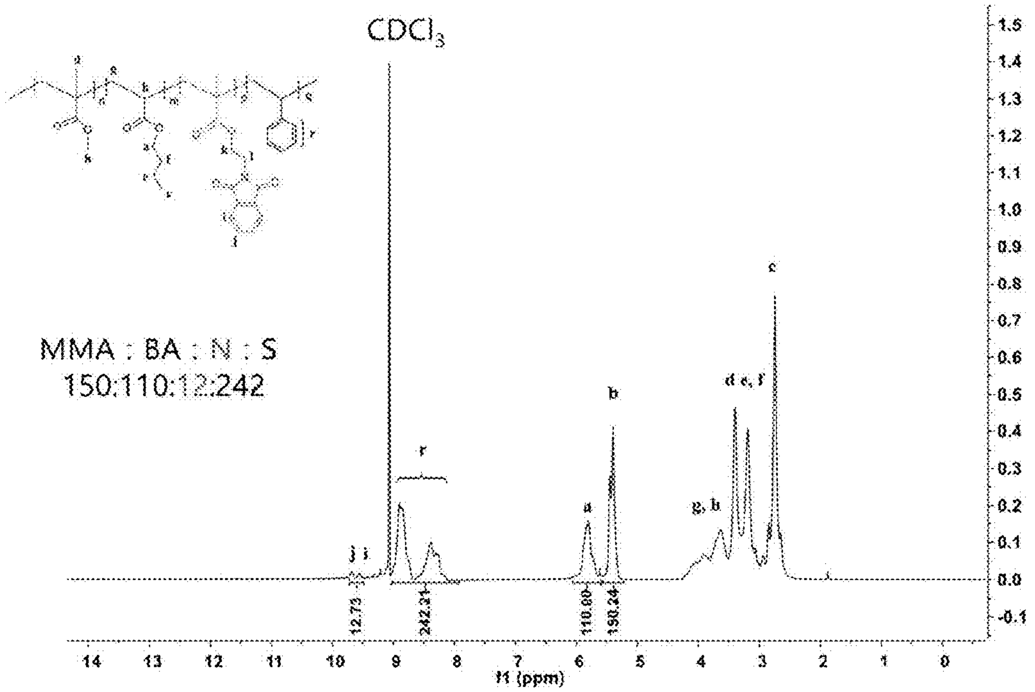
Figure 2D:
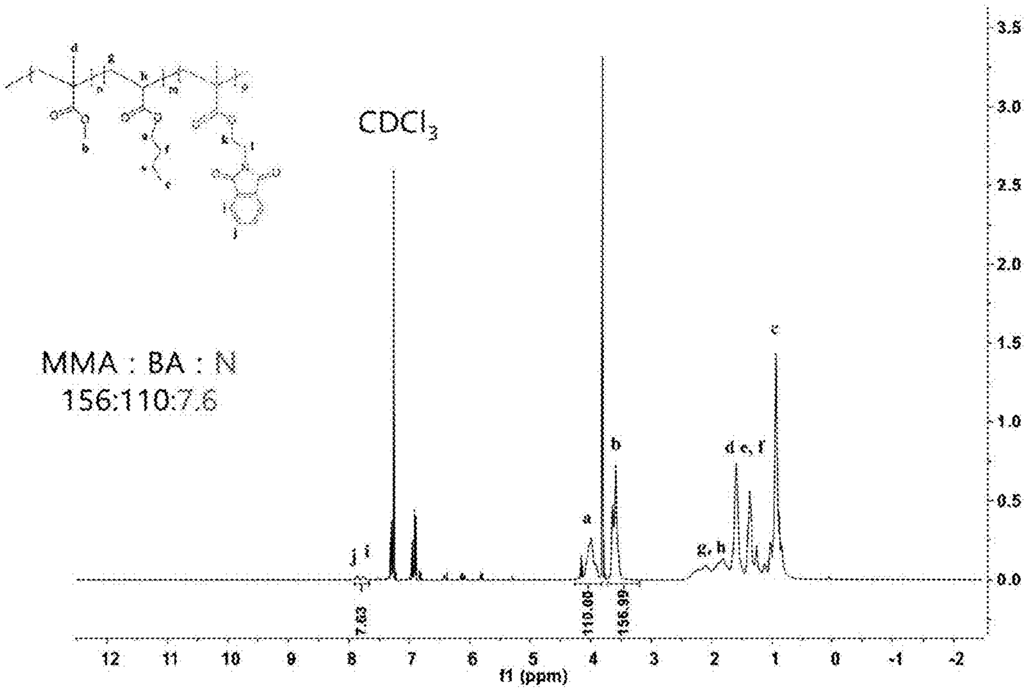

Referring to FIGS. 2B to 2D, the results of $^1$H-NMR analysis on the self-healing block copolymer prepared in Preparation Example 3 revealed changes in peaks a and b and the generation of r peak due to the bonding of styrene in FIGS. 2B to 2D.

Therefore, based on the results of $^1$H-NMR analysis, it was found that the copolymers prepared in Preparation Example 2 and Preparation Example 3 were produced in the desired forms.

The results of analysis on the number-average molecular weight (Mn), weight-average molecular weight (Mw) and polydispersity index (PDI) of the self-healing copolymer prepared in Preparation Example 2 revealed the preparation of polymers having the values as shown in the following Table 1:

TABLE 1

| | Copolymer | | | | | | |
|---|---|---|---|---|---|---|---|
| | MBN(5) | MBN(10) | MBP(5) | MBP(10) | MBH(5) | MBH(10) | MB MMA:BA = 45:55 |
| NPEMA | 5 | 10 | — | — | — | — | — |
| PMA | — | — | 5 | 10 | — | — | — |
| HPMAA | — | — | — | — | 5 | 10 | — |
| $M_n$(g/mol) | 18,800 | 19,000 | 14,900 | 20,000 | 17,500 | 21,000 | 21,000 |
| $M_w$(g/mol) | 56,000 | 74,000 | 50,000 | 0,000 | 55,000 | 74,000 | 83,000 |
| PDI | 2.98 | 3.90 | 3.39 | 3.48 | 3.13 | 3.53 | 3.89 |

Figure 3:
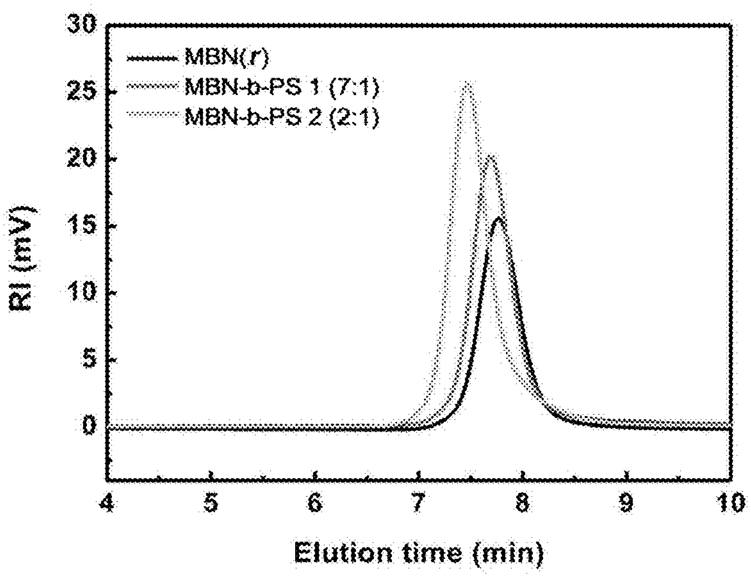
FIG. 3 is a graph depicting the results of analyzing self-healing block copolymers (MBN-b-PS 1 and MBN-b-PS 2) and self-healing random copolymers (MMA-r-BA-r-NPEMA, MBN(r)) of the present inventive concept analyzed by GPC.

Referring to FIG. 3, the results of Gel-permeation chromatography (GPC) analysis on the self-healing block copolymer prepared in Preparation Example 3 revealed that the number-average molecular weight (Mn), weight-average molecular weight (Mw) and polydispersity index (PDI) are represented by the values as shown in the following Table 2:

TABLE 2

| Copolymer | MBN(r) | MBN-b-PS 1 | MBN-b-PS 2 |
|---|---|---|---|
| $M_n$(g/mol) | 36,000 | 41,000 | 55,000 |
| $M_w$(g/mol) | 40,000 | 45,000 | 61,000 |
| PDI | 1.13 | 1.11 | 1.11 |

Experimental Example 2: Identification of Self-Healing Effects of Self-Healing Copolymer Films at Room Temperature After forming scratches on the surfaces of the self-healing copolymer films prepared in Preparation Example 4, the self-healing effects at room temperature were observed.

Specifically, scratches were formed on the surfaces of the self-healing copolymer films prepared in Preparation Example 4 using a 1.0 N Hardness Test Pencil (Model 318S, Marking Pin No. 2-1.0 mm (ISO1518 & GMW Standard)). Moreover, scratches were formed on the film surfaces using a razor blade. The self-healing copolymer films with scratches were left at room temperature, and the changes in scratches over time were observed.

Figure 4A:
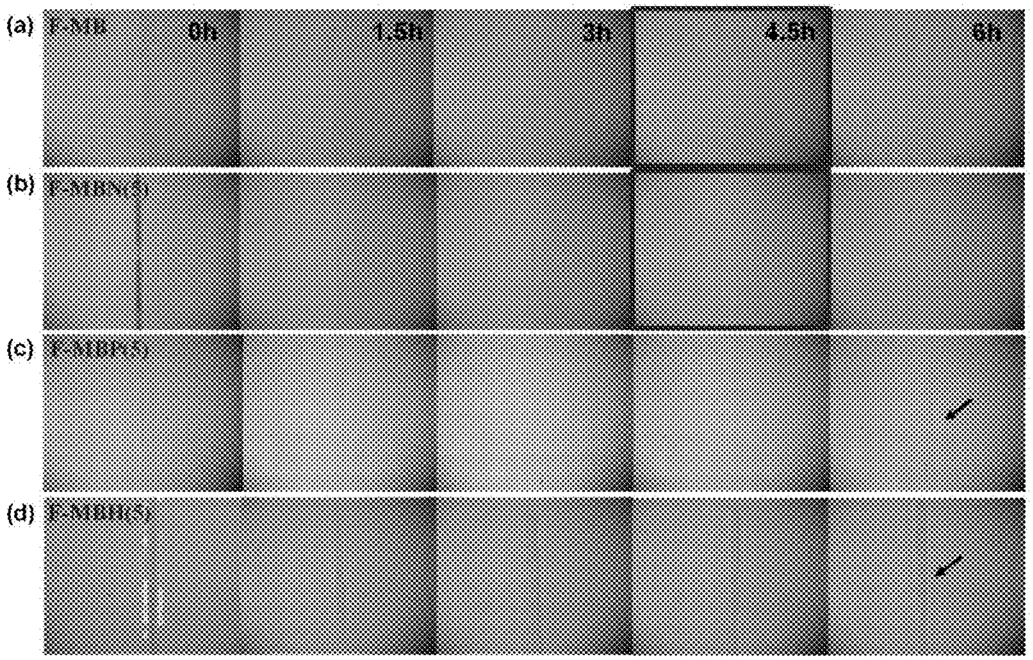
FIGS. 4A-4B show images depicting the degree of recovery from scratches formed on the surface of self-healing copolymer films (F-MB, F-MBN(5), F-MBP(5), F-MBH(5), F-MBN(10), F-MBP(10) and F-MBH(10)) of the present inventive concept after being left at room temperature over time observed by Optical Microscope(OM)
Figure 4B:
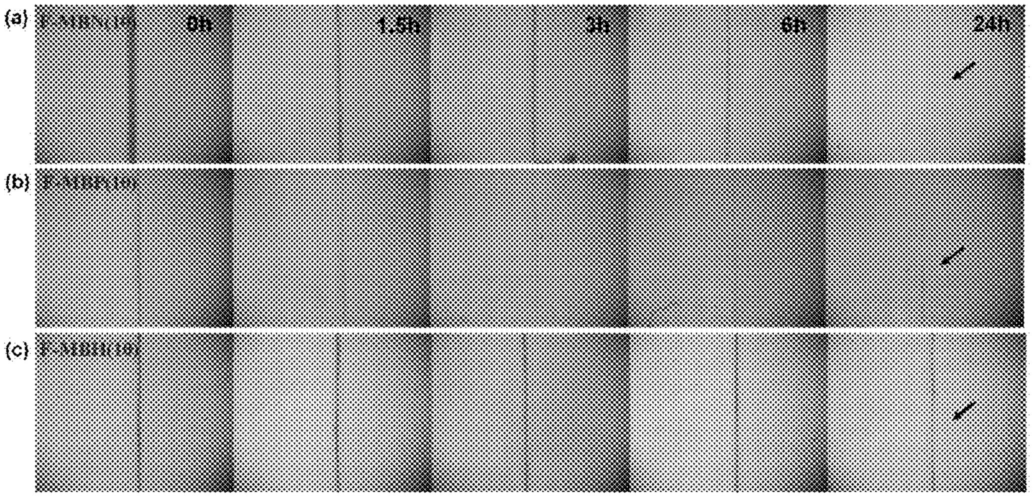

Referring to FIGS. 4A and 4B, after forming scratches on F-MB which did not contain the third monomer, and F-MBN (5) with a molar ratio of 5 of NPEMA which was the third monomer, and leaving it at room temperature for 6 hours, it was observed with the Optical Microscope(OM) that all scratches completely healed after 4.5 hours (FIG. 4A (a) and (b)). Meanwhile, in the case of F-MBN(10) with a molar ratio of 10 of NPEMA, it was observed that after forming scratches and leaving it at room temperature for 24 hours, it was observed that some of the scratches healed, but traces of the scratches remained (FIG. 4B (a)). Furthermore, after forming scratches on F-MBP(5) and F-MBH(5) with a molar ratio of 5 of PMA and HPMAA of 5 and leaving them at room temperature for 6 hours, it was observed with the OM that some of the scratches healed, but traces of the scratches remained (FIG. 4A (c) and (d)), and for F-MBP(10) and F-MBH(10), with a molar ratio of 10 of PMA and HPMAA, some of the scratches healed, but traces of the scratches remained even after 24 hours (FIG. 4B (b) and (c)).

Figure 5A:
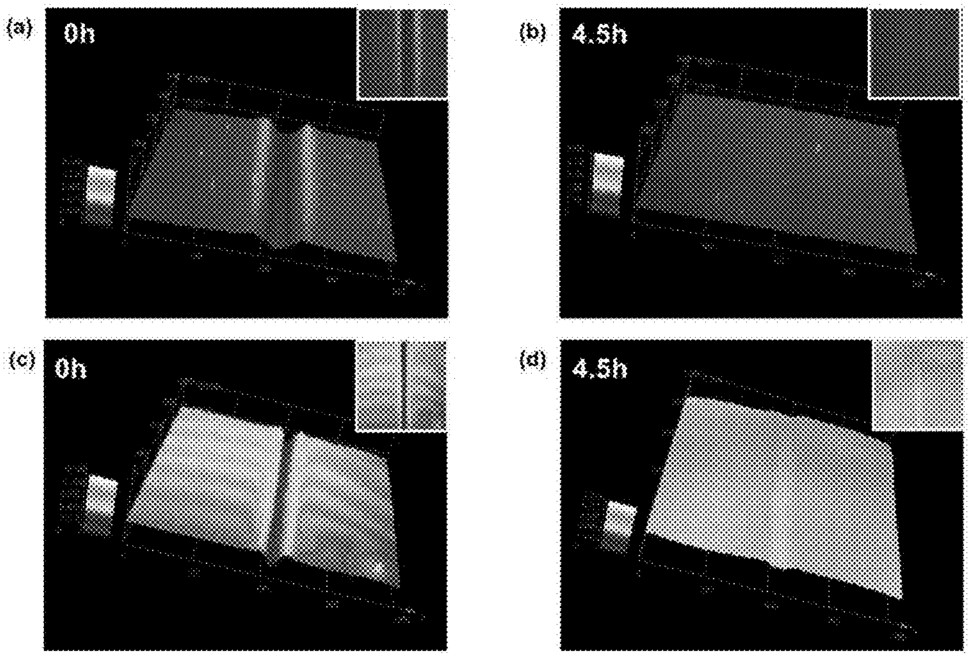
FIGS. 5A-5B show 3D images depicting the scratches immediately after being formed on the surface of F-MB, F-MBN(5) and F-MBP(5) of the present inventive concept and after being left at room temperature.
Figure 5B:
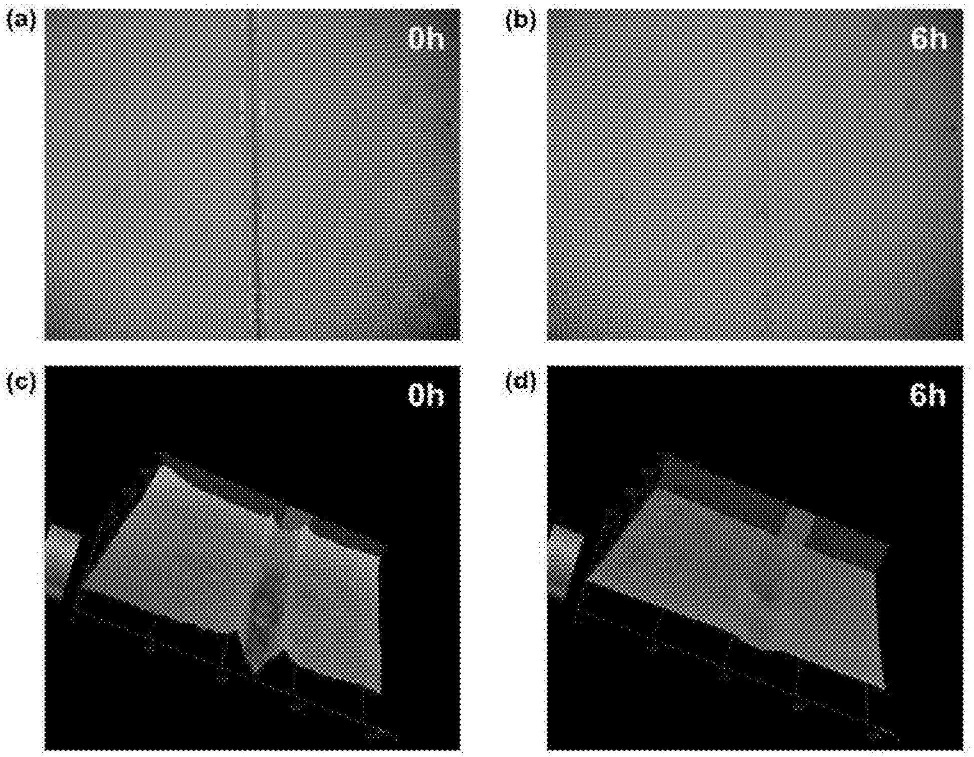

Referring to FIG. 5A, the results of comparison of 3D images taken immediately after forming scratches and 4.5 hours later on F-MB and F-MBN(5) revealed that the scratches on both F-MB and F-MBN(5) healed (F-MB: (a) and (b); F-MBN(5): (c) and (d)). Referring to FIG. 5B, the results of comparison of images ((a) and (b)) and 3D images ((c) and (d)) taken immediately after forming scratches and 6 hours later on the F-MBP(5) revealed that some of the scratches healed, but traces of the scratches remained.

Figure 6A:
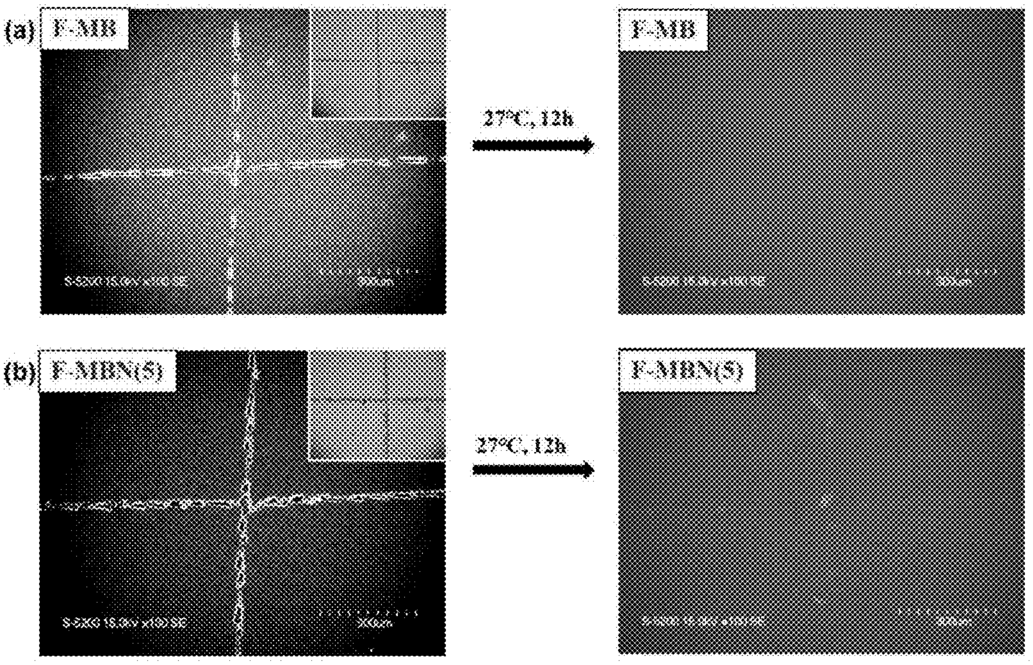
FIGS. 6A-6B show images depicting the scratches formed on the surface of F-MB, F-MBN(5) and F-MBP(5) of the present inventive concept after being left at room temperature for 12 hours observed by Scanning Electron Microscope (SEM)
Figure 6B:
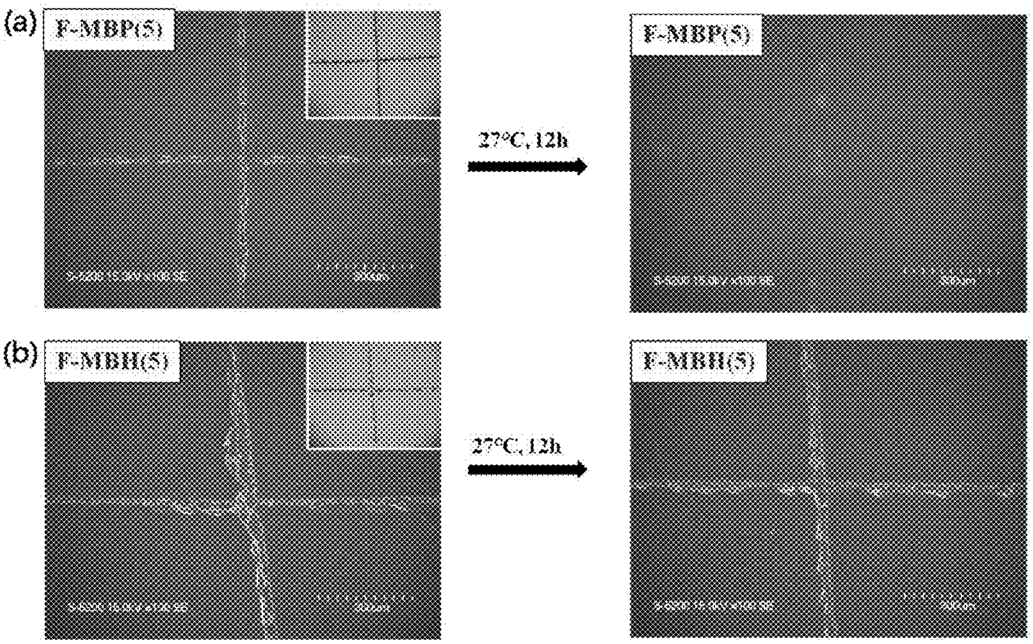

Referring to FIG. 6A, after forming scratches on F-MB and F-MBN(5) and leaving them at room temperature (27° C.) for 12 hours, it was observed with the SEM that the scratches formed on both F-MB and F-MBN(5) healed. Furthermore, it was confirmed that F-MBN(5) (FIG. 6A (b)) exhibited superior healing effects compared to F-MB (FIG. 6A (a)). Referring to FIG. 6B, after forming scratches on F-MBP(5) (FIG. 6B (c)) and F-MBH(5) (FIG. 6B (d)) and leaving the at room temperature (27° C.) for 12 hours, it was observed with the SEM that the scratches formed on both F-MBN(5) and F-MBP(5) healed. Furthermore, it was confirmed that F-MBN(5) (FIG. 6A (b)) also exhibited superior healing effects.

Experimental Example 3: Identification of Self-Healing Effects of Self-Healing Copolymer Films and Self-Healing Block Copolymer Films at Glass Transition Temperature of +40° C.

3-1. Identification of Glass Transition Temperatures of Self-Healing Copolymer and Self-Healing Block Copolymer The glass transition temperatures of the self-healing copolymer prepared in Preparation Example 2 and the self-healing block copolymer prepared in Preparation Example 3 were analyzed by a Differential Scanning calorimeter (DSC).

Figure 7A:
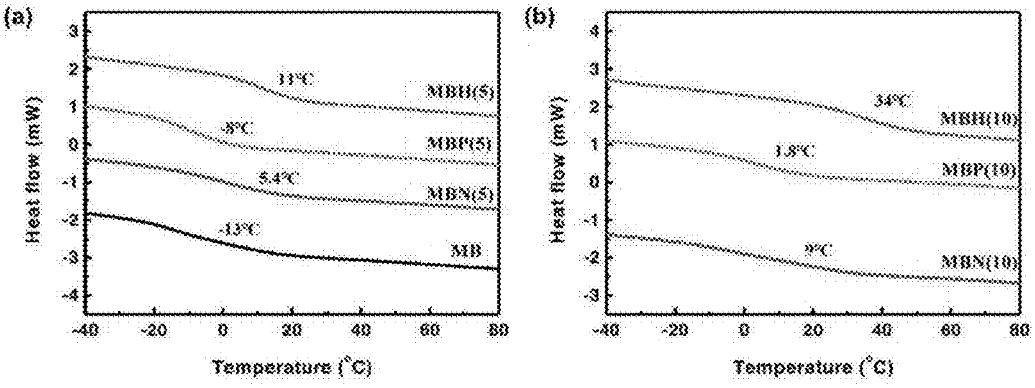
FIGS. 7A-7B show graphs depicting the results of analyzing MB, MBN(5), MBP(5), MBH(5), MBN(10), MBP(10), MBH(10), MBN-b-PS 1 and MBN-b-PS 2 of the present inventive concept by DSC and the glass transition temperatures.
Figure 7B:
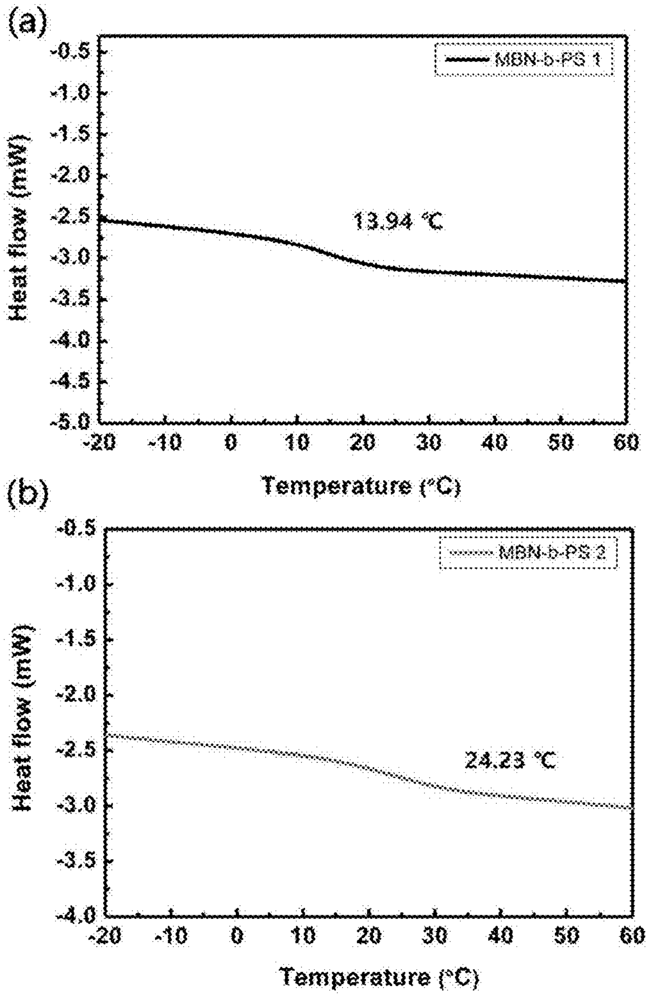

Referring to FIGS. 7A and 7B, the results of analysis on the self-healing copolymers MB, MBN(5, 10), MBP(5, 10), and MBH(5, 10) prepared in Preparation Example 2 and the self-healing block copolymers MBN-b-PS 1(FIG. 7B (a)) and MBN-b-PS 2 (FIG. 7B (b)) prepared in Preparation Example 3 revealed that the glass transition temperatures are represented by the values as shown in the following Tables 3 and 4:

TABLE 3

| | Copolymer | | | | | | |
|---|---|---|---|---|---|---|---|
| | F-MBN(5) | F-MBN(10) | F-MBP(5) | F-MBP(10) | F-MBH(5) | F-MBH(10) | F-MB |
| Glass transition temperature | 5.4° C. | 9° C. | −8° C. | 1.8° C. | 11° C. | 34° C. | −13° C. |

TABLE 4

| | MBN(r) | MBN-b-PS 1 | MBN-b-PS 2 |
|---|---|---|---|
| Glass transition temperature | −1.8° C. | 13.94° C. | 24.23° C. |

3-2. Identification of Self-Healing Effects of Self-Healing Copolymer Films at Glass Transition Temperature of +40° C.

After forming scratches on the surfaces of the self-healing copolymer films prepared in Preparation Example 4, the self-healing effects at a glass transition temperature of +40° C. were observed. Specifically, after forming scratches on the surfaces of the self-healing copolymer films in Preparation Example 4 using a 1.0 N Hardness Test Pencil (Model 318S, Marking Pin No. 2-1.0 mm (ISO1518 & GMW Standard)) and a razor blade, the self-healing copolymer films with scratches were left at a glass transition temperature of +40° C., and the changes in scratches over time were observed with OM.

Figure 8A:
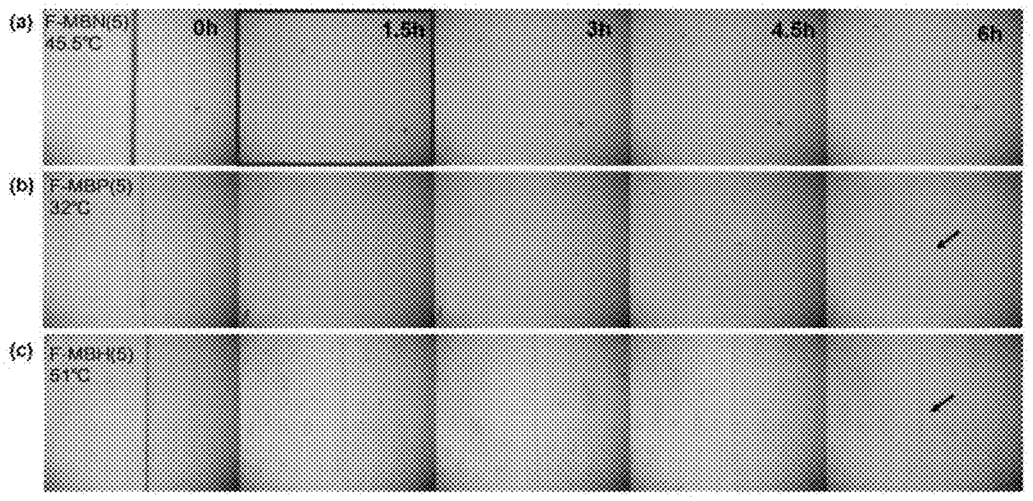
FIGS. 8A-8B show images depicting the degree of recovery from scratches formed on the surface of F-MB, F-MBN(5), F-MBN(10), F-MBP(5), F-MBP(10), F-MBH(5) and F-MBH(10) of the present inventive concept after being left at a glass transition temperature of +40° C. over time observed by OM.
Figure 8B:
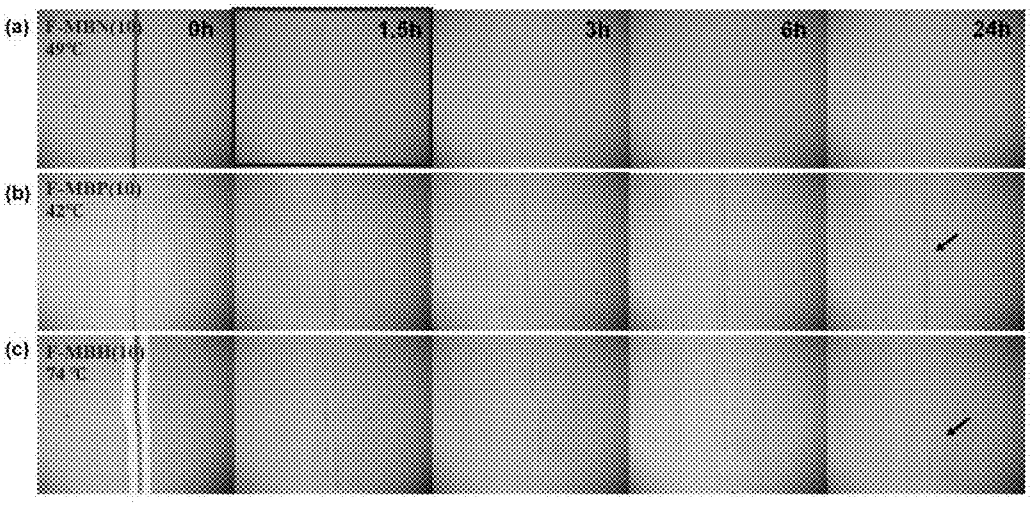

Referring to FIGS. 8A and 8B, the results of leaving F-MBN(5) with scratches on the surface at 45.5° C., F-MBN (10) at 49° C., F-MBP(5) at 32° C., F-MBP(10) at 42° C., F-MBH(5) at 51° C., and F-MBH(10) at 72° C. revealed that the scratches on F-MBN(5) and F-MBN(10) completely healed after 1.5 hours(FIG. 8A (a) and FIG. 8B (a)).

On the contrary, in the case of F-MBP(5) and F-MBH(5), some of the scratches healed, but traces of the scratches remained even after 6 hours (FIG. 8A (b) and (c)), and in the case of F-MBP(10) and F-MBH(10), some of the scratches healed, but traces of the scratches remained even after 24 hours (FIG. 8B (b) and (c)).

Figure 9:
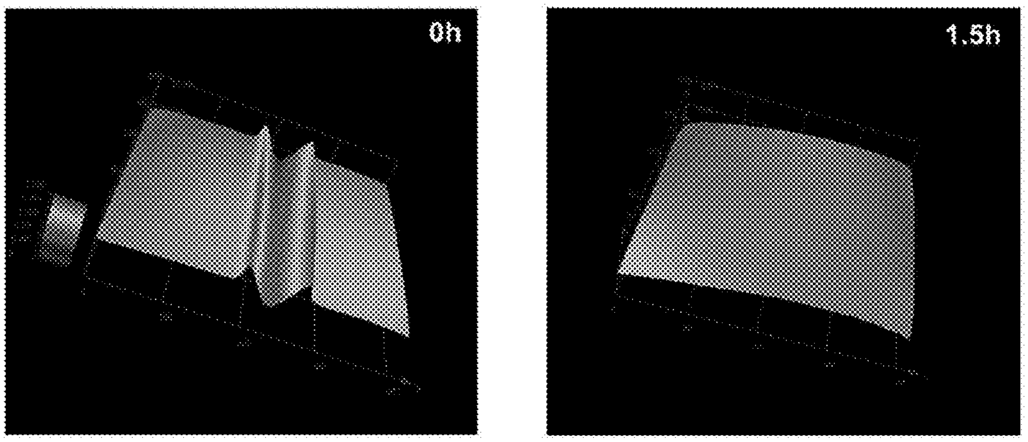
FIG. 9 shows 3D images depicting the scratches immediately after being formed on the surface of F-MBN(5) of the present inventive concept and after being left at a glass transition temperature of +40° C. for 1.5 hours.

Referring to FIG. 9, the results of comparison of 3D images taken immediately after forming scratches and 1.5 hours later at 45.5° C. on F-MBN(5) revealed that the scratches completely healed after 1.5 hours.

Figure 10:
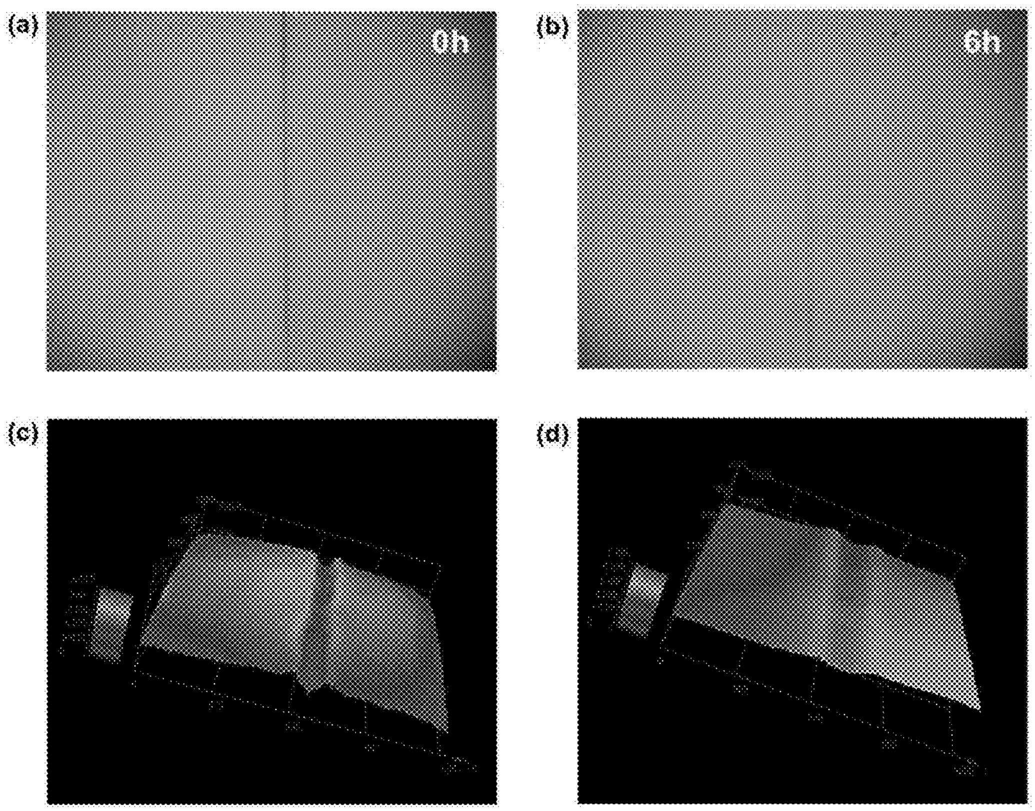
FIG. 10 shows images and 3D images depicting the scratches immediately after being formed on the surface of F-MBP(5) of the present inventive concept and after being left at a glass transition temperature of +40° C. for 6 hours.

Referring to FIG. 10, the results of comparison of images ((a) and (b)) and 3D images ((c) and (d)) taken immediately after forming scratches on F-MBN(5) and 6 hours later at 45.5° C. revealed that some of the scratches healed, but traces of the scratches remained even after 6 hours.

3-3. Identification of Self-Healing Effects of Self-Healing Block Copolymer Films at Glass Transition Temperature of +40° C.

After forming scratches on the surfaces of the self-healing block copolymer films prepared in Preparation Example 5 in the same manner as in Experimental Example 3-2, the self-healing block copolymer films were left at a glass transition temperature of +40° C., and the changes in scratches over time were observed with a scanning electron microscope (SEM).

Figure 11A:
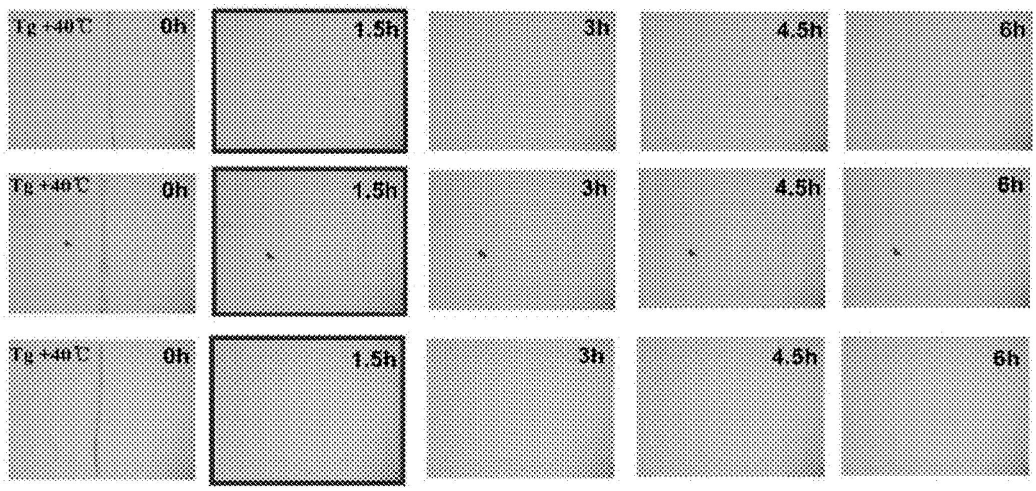
FIGS. 11A-11C shows images depicting the degree of recovery from scratches formed on the surface of F-MBN-b-PS 1, F-MBN-b-PS 2 and F-MBN(r) of the present inventive concept after being left at a glass transition temperature of +40° C. over time observed by OM.
Figure 11B:
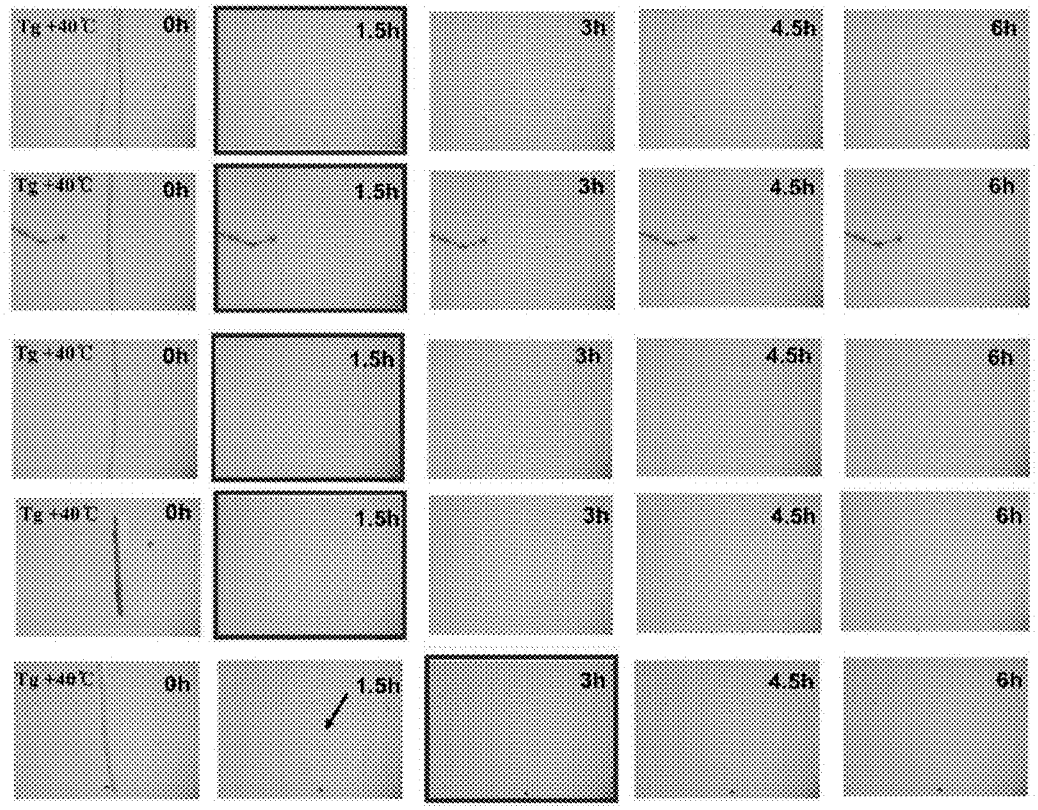
Figure 11C:
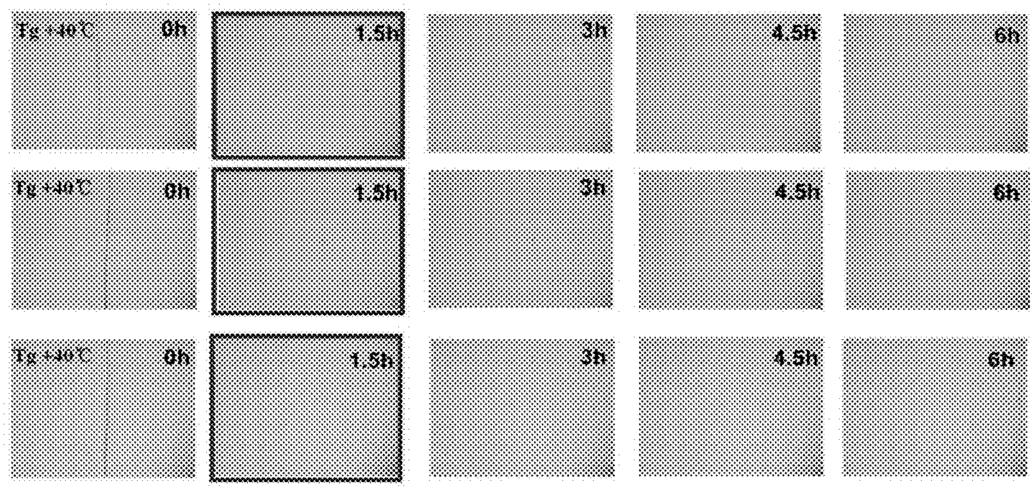

Referring to FIGS. 11A to 11C, the results of leaving F-MBN-b-PS 1 with scratches on the surface at 43.94° C. (FIG. 11A), F-MBN-b-PS 2 at 64.23° C. (FIG. 11B), and F-MBN(r) at 38.02° C. (FIG. 11C), revealed that all scratches healed after 1.5 to 3 hours.

Figure 12:
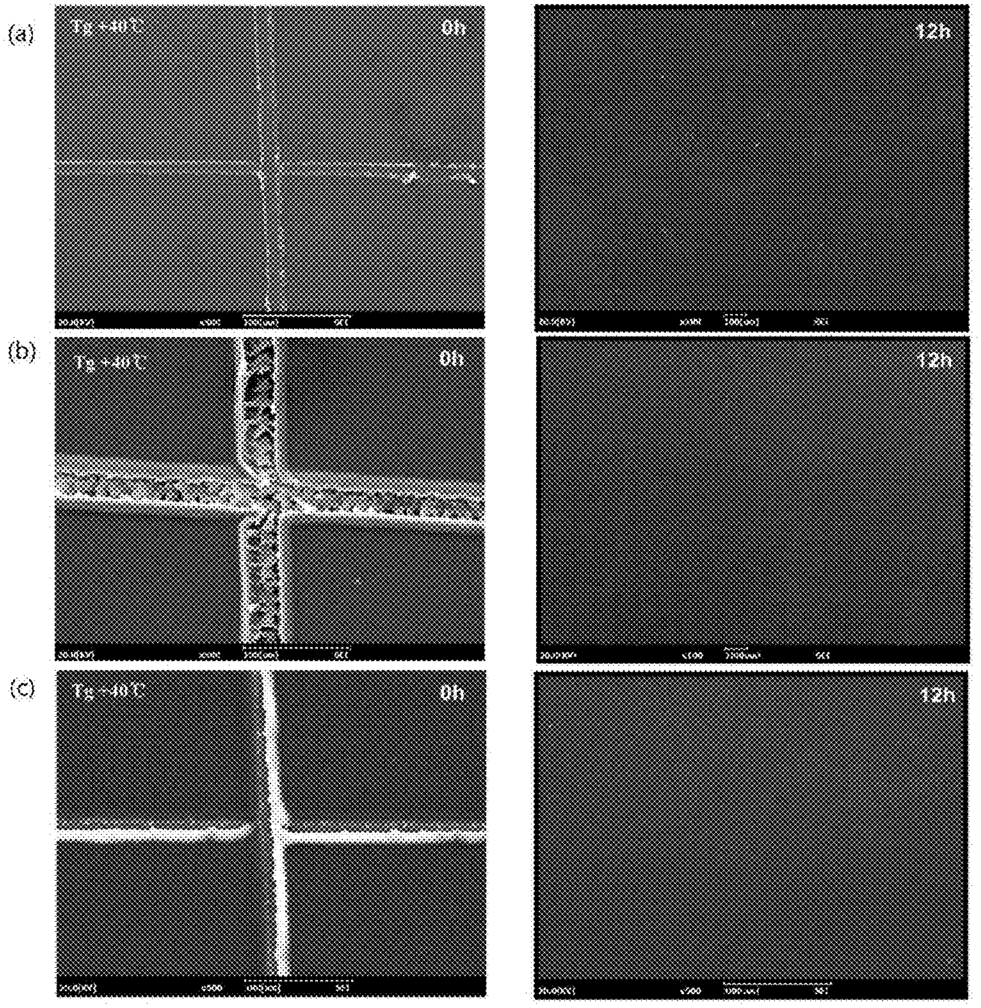
FIG. 12 shows images depicting the degree of recovery from scratches formed on the surfaces of F-MBN-b-PS 1, F-MBN-b-PS 2 and F-MBN(r) of the present inventive concept after being left at a glass transition temperature of +40° C. for 12 hours taken by a scanning electron microscope (SEM)

Referring to FIG. 12, the results of leaving F-MBN-b-PS 1 (FIG. 12 (*a*)), F-MBN-b-PS 2 (FIG. 12 (*b*)) and F-MBN(r) (FIG. 12 (*c*)) with scratched on the surface at a glass transition temperature of +40° C. revealed that the scratches completely healed within 12 hours.

Experimental Example 4: Identification of Tensile Strength and Young's Modulus of Self-Healing Copolymer Films or Self-Healing Block Copolymer Films 4-1. Identification of Tensile Strength and Young's Modulus of Self-Healing Copolymer Films The tensile strength and Young's modulus of the self-healing copolymer films prepared in Preparation Example 4 were measured. Specifically, F-MBN(5), F-MBN(10), F-MBP(5), F-MBP(10), F-MBH(5), F-MBH(10) and F-MB were cut to a dimension of 4 cm in length and 1 cm in width, the tensile strength and Young's modulus were measured using a universal testing machine (UTM) with a crosshead speed of 300 mm/min and a gauge length of 100 mm. The measurement of tensile strength was conducted five times and the average values were obtained.

Figure 13:
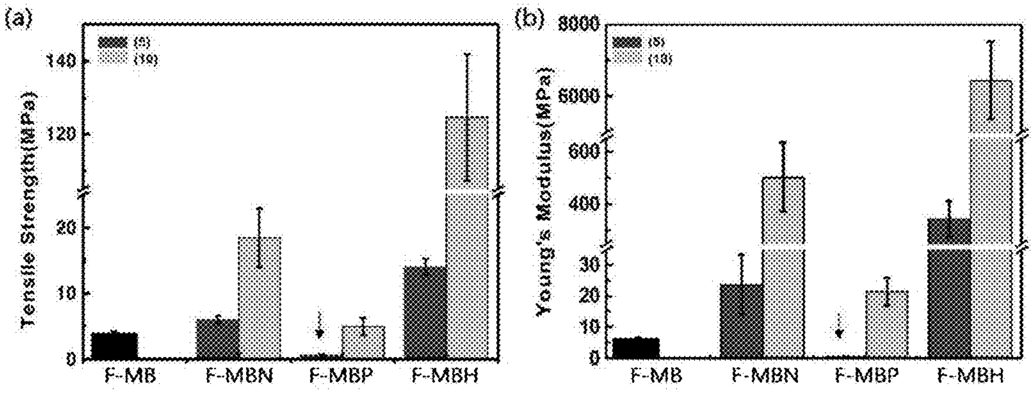
FIG. 13 shows graphs depicting the results of measuring the tensile strength (a) and Young's modulus (b) of F-MB, F-MBN(5), F-MBP(5), F-MBH(5), F-MBN(10), F-MBP(10) and F-MBH(10) of the present inventive concept.

Referring to FIG. 13, it was found that the tensile strength and Young's modulus of the self-healing copolymer films prepared in Preparation Example 4 are represented by the values as shown in the following Table 5:

TABLE 5

| | Copolymer | | | | | | |
|---|---|---|---|---|---|---|---|
| | F-MBN(5) | F-MBN(10) | F-MBP(5) | F-MBP(10) | F-MBH(5) | F-MBH(10) | F-MB |
| Tensile strength | 5.9 | 18.4 | 0.6 | 4.9 | 13.9 | 124.5 | 3.4 |
| Young's modulus | 23.7 | 504.3 | 0.5 | 21.4 | 2345.5 | 5731.5 | 5.7 |

4-2. Identification of Tensile Strength and Young's Modulus of Self-Healing Block Copolymer Films The tensile strength and Young's modulus of the self-healing block copolymer films prepared in Preparation Example 5 were measured in the same manner as in Experimental Example 4-1.

Figure 14:
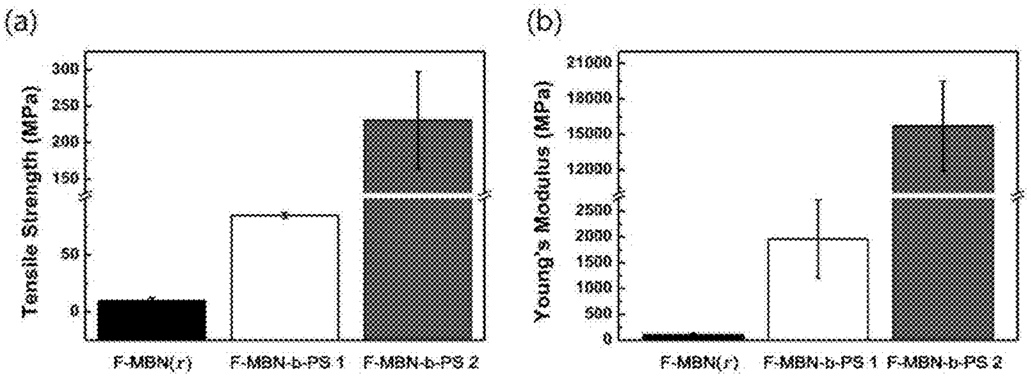
FIG. 14 shows graphs depicting the results of measuring the tensile strength (a) and Young's modulus (b) of F-MBN-b-PS 1, F-MBN-b-PS 2 and F-MBN(r) of the present inventive concept.

Referring to FIG. 14, it was found that the tensile strength and Young's modulus of the self-healing block copolymer films prepared in Preparation Example 5 are represented by the values as shown in the following Table 6:

TABLE 6

| | F-MBN(r) | F-MBN-b-PS 1 | F-MBN-b-PS 2 |
|---|---|---|---|
| Tensile strength | 11.6 MPa | 87.1 MPa | 323.3 MPa |
| Young's modulus | 133.2 MPa | 2636.1 MPa | 18,600 MPa |

Experimental Example 5: Identification of Elastic Recovery and Transparency of Self-Healing Copolymer Films 5-1. Identification of Elastic Recovery of Self-Healing Copolymer Films After cutting the self-healing copolymer films prepared in Preparation Example 4 to a dimension of 4 cm in length and 1 cm in width and stretching them to a length of 20 cm or more using a universal testing machine (UTM), and the degree of recovery was examined to determine the elastic recovery.

Figure 15:
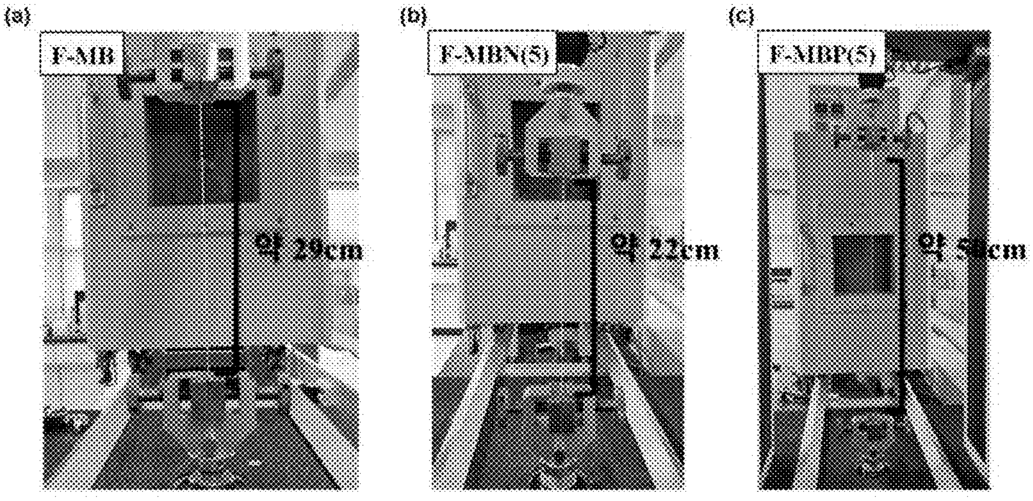
FIG. 15 shows the degree of stretching of F-MB, F-MBN(5) and F-MBP(5) of the present inventive concept measured by a universal testing machine (UTM)

Referring to FIG. 15, it was found that F-MB, F-MBN(5), and F-MBP(5) can stretch up to 29 cm, 22 cm, and 50 cm, respectively.

Figure 16:
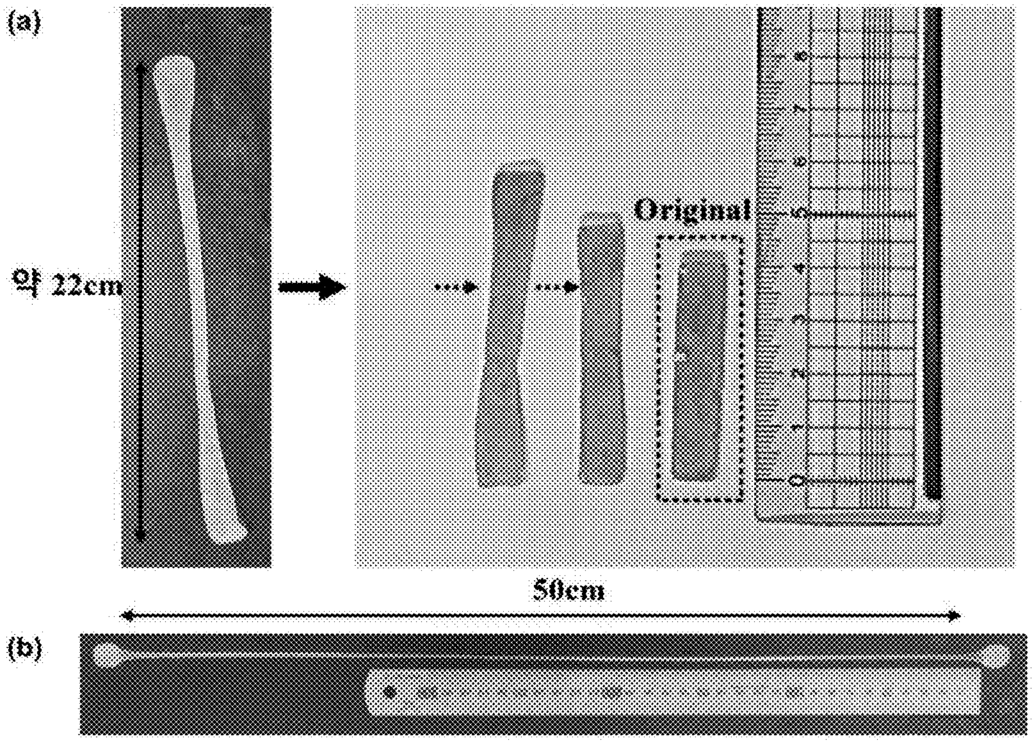
FIG. 16 shows the degree of recovery of F-MB, F-MBN(5) and F-MBP(5) of the present inventive concept stretched by a universal testing machine (UTM)

Referring to FIG. 16, it was observed that F-MBN(5) exhibited elastic recovery as it recovered from 22 cm to a length close to the original sample length of 4 cm (FIG. 16 (*a*)), but F-MBP(5) did not recover from its stretched state of 50 cm (FIG. 16 (*b*)).

5-2. Identification of Transparency of Self-Healing Copolymer Films

The self-healing copolymer films, F-MB, F-MBN(5), F-MBP(5) and F-MBH(5), prepared in Preparation Example 4 were evaluated for their transparency.

Figure 17:
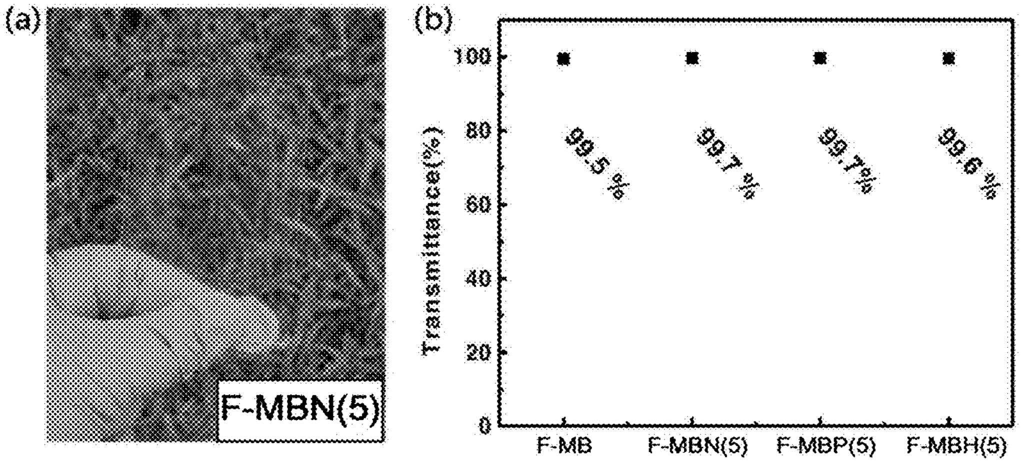
FIG. 17 shows the transparency of the F-MB, F-MBN(5), F-MBP(5) and F-MBH(5) of the present inventive concept.

Referring to FIG. 17, it can be seen that all four films exhibited a transparency of 99.5% or higher.

Comparative Example 2: Self-Healing Copolymer Films Prepared by Different Methods 2-1. Preparation of MMA-BA-NPEMA Copolymer with Different Initiator A mixture of 76.90 mmol MMA and BA with a molar ratio of 45:55 was prepared to prepare a first mixed solution, and a solution obtained by dissolving 0.988 g of NPEMA, prepared in Preparation Example 1-1, in anisole solvent was added to the first mixed solution to prepare a second mixed solution.

To the second mixed solution, ethyl 2-bromoisobutyrate (eBiB), 0.05 g of CuBr, and 0.5 ml of pentamethyldiethylenetriamine (PMDETA) were added, and the mixture was purged with nitrogen for 30 minutes and then reacted at 85° C. for 24 hours. The resulting mixture was cooled to terminate the reaction, and then precipitated in an excess of hexane to prepare $MMA_{-co-}BA_{-co-}$NPEMA copolymer (A-MBN(5)).

2-2. Preparation of Film (F-A-MBN(5)) Using MMA-BA-NPEMA Copolymer with Different Initiator A-MBN(5) prepared in Comparative Example 2-1 was dissolved in toluene solvent to prepare a 30 wt % A-MBN(5) solution, and this solution was coated onto a glass substrate by bar coating. The glass substrate coated with the MBN (5)solution was dried at 80° C. for 24 hours to prepare a copolymer film (F-A-MBN(5)) having a thickness of 20 μm.

2-3. Identification of Self-Healing Effects of Self-Healing Films at Room Temperature and Glass Transition Temperature of +40° C.

Scratches were formed on the surface of the film prepared in Comparative Example 2-2 in the same manner as in Experimental Example 1, and the self-healing effects were then evaluated at room temperature and at a glass transition temperature of +40° C. The glass transition temperature was confirmed to be 25° C. using DSC.

Figure 18:
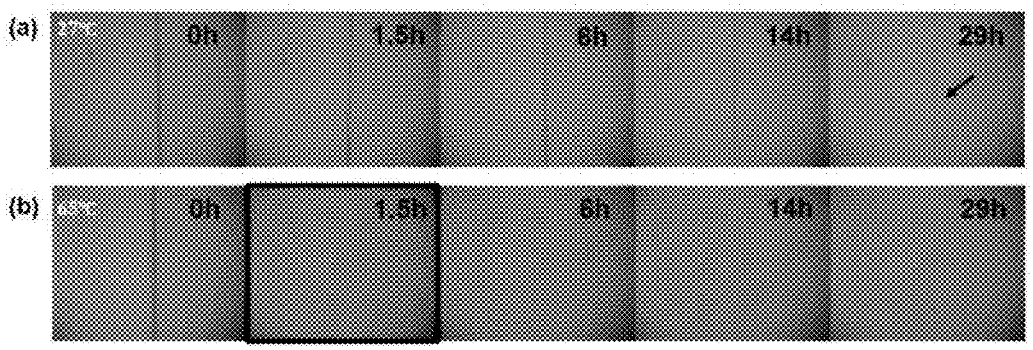
FIG. 18 shows images depicting the scratches formed on the surface of F-A-MBN(5) of the Comparative Example, and after being left at 27° C. and 65° C. over time observed by OM.

Referring to FIG. 18, after forming scratches on F-A-MBN(5) and leaving it at 27° C. and 65° C., it was observed with the OM that some of scratches healed at 27° C. but traces of the scratches remained after 29 hours (FIG. 18 (*a*)). On the contrary the scratch on F-A-MBN(5) completely healed after 1.5 at 65° C. (FIG. 18 (*b*)).

Figure 19:
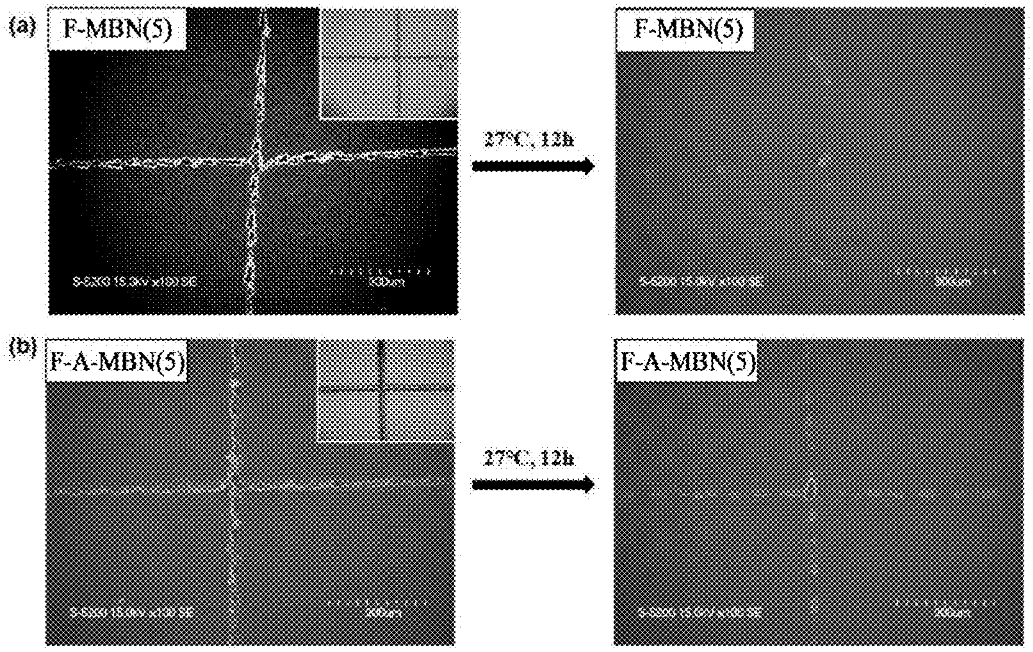
FIG. 19 show images depicting the scratches formed on the surface of F-MBN(5) of the present inventive concept and F-A-MBN(5) of the Comparative Example, and after being left at 27° C. for 12 hours observed by SEM.

Referring to FIG. 19, the results of comparison of F-MBN (5) prepared in Preparation Example 4-1 and F-A-MBN(5) Comparative Example 2-2 revealed that self-healing effects, and it is confirmed that F-MBN(5) (FIG. 19 (*b*)) exhibited superior healing effects.

In conclusion, the results of FT-IR and $^{1}$H-NMR analyses on the structures of the self-healing copolymers and the self-healing random copolymers prepared by the preparation method of the present inventive concept revealed the self-healing copolymers with MMA$_{\text{-co-}}$BA (MB), MMA$_{\text{-co-}}$BA$_{\text{-co-}}$NPEMA (MBN), MMA$_{\text{-co-}}$BA$_{\text{-co-}}$PMA (MBP) and MMA$_{\text{-co-}}$BA$_{\text{-co-}}$HPMAA (MBH) structures and self-healing block copolymers with MBN-b-PS structure comprising self-healing random copolymers(MMA-r-BA-r-NPEMA, MBN(r)) and copolymerized styrene.

Moreover, after forming scratches on the surfaces of films prepared using the self-healing copolymers of the present inventive concept (F-MB, F-MBN, F-MBP and F-MBH) or films prepared using the self-healing block copolymers (F-MBN-b-PS 1 and F-MBN-b-PS 2) and leaving them at a glass transition temperature of +40° C., it was observed with OM and SEM that these films exhibited excellent self-healing effects.

Furthermore, the self-healing copolymer film F-MBN and the self-healing block copolymer films F-MBN-b-PS 1 and F-MBN-b-PS 2 of the present inventive concept were tested for tensile strength and Young's modulus, and it was confirmed that these films exhibited excellent mechanical properties and flexibility.

While the inventive concept has been shown and described with reference to certain preferred embodiments thereof, it will be understood by those skilled in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

What is claimed is:

1. A self-healing block copolymer comprising:

a self-healing random copolymer; and a styrene-based compound polymerized at the end of the self-healing random copolymer, wherein the self-healing random copolymer is a random copolymer comprising:

a first monomer that is a methacrylate-based compound;

a second monomer that is an acrylate-based compound; and a third monomer that is N-2-(phthalimido ethyl methacrylate) (NPEMA), phenyl methacrylate (PMA) or N-(4-hydroxyphenyl)methacrylamide (HPMMA).

2. The self-healing block copolymer of claim 1, wherein the first monomer of the self-healing random copolymer is at least one methacrylate-based compound selected from the group consisting of diethylaminoethyl methacrylate (DEAEMA, DEA), dimethylaminoethyl methacrylate (DMAEMA, DMA), N-isopropylacrylamide (NIPAAm), methyl methacrylate (MMA), ethyl methacrylate, propyl methacrylate, butyl methacrylate and cyclohexyl methacrylate.

3. The self-healing block copolymer of claim 1, wherein the second monomer of the self-healing random copolymer is at least one acrylate-based compound selected from the group consisting of methyl methacrylate (MMA), ethyl methacrylate, propyl methacrylate, butyl methacrylate (BMA), methyl acrylate, ethyl acrylate, propyl acrylate and butyl acrylate (BA).

4. The self-healing block copolymer of claim 1, wherein the styrene-based compound polymerized at the end of the self-healing random copolymer is at least one selected from the group consisting of styrene, methyl styrene, ethyl styrene, propyl styrene, butyl styrene, and halogenated styrene.

5. The self-healing block copolymer of claim 1, wherein the self-healing block copolymer has a structure represented by one of the following Formulae 8 to 10:

[Formula 8]

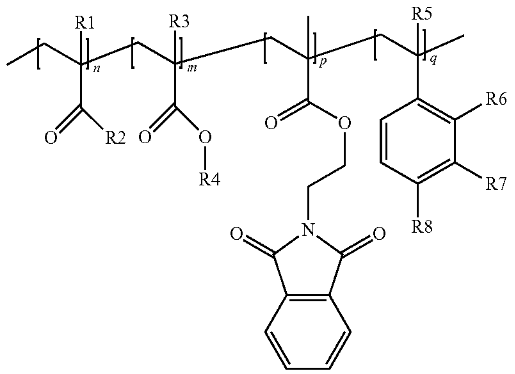

[Formula 9]

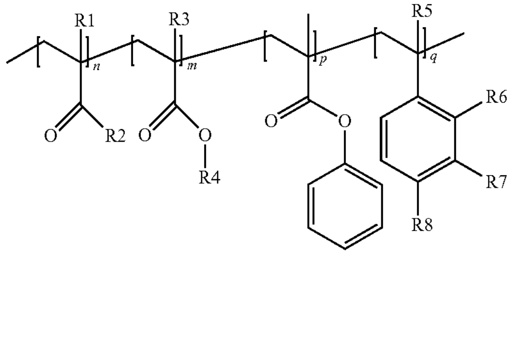

-continued

[Formula 10]

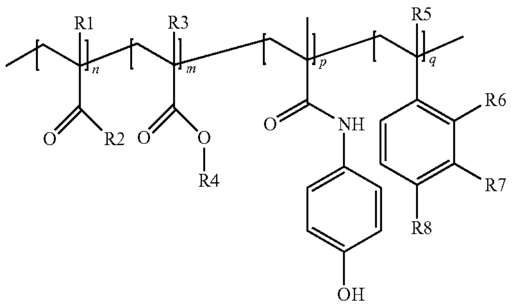

wherein R1 and R3 each is hydrogen (H) or a methyl group ($CH_3$); R2 is $OCH_3$,

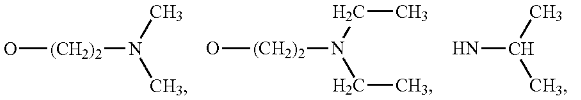

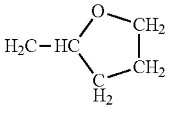

or

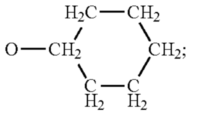

R4 is a methyl group, an ethyl group, a propyl group, an isopropyl group, or a butyl group; and R5 to R8 each is hydrogen, a methyl group, an ethyl group, an butyl group, a t-butyl group, bromine (Br), or chlorine (Cl), and wherein n+m+p+q is 1, where n is 0.2 to 0.5, m is 0.2 to 0.6, p is 0.01 to 0.2, and q is 0.1 to 0.5.

6. The self-healing block copolymer of claim 1, wherein the self-healing block copolymer has a glass transition temperature of 10° C. or more.

7. A method of preparing a self-healing block copolymer: comprising the steps of:

preparing a first mixed solution containing a first monomer that is a methacrylate-based compound, a second monomer that is an acrylate-based compound and a third monomer that is N-2-(phthalimido ethyl methacrylate) (NPEMA), phenyl methacrylate (PMA) or N-(4-hydroxyphenyl)methacrylamide (HPMMA);

preparing a self-healing random copolymer by stabilizing and copolymerizing the first mixed solution;

preparing a second mixed solution containing the self-healing random copolymer and a styrene-based compound; and preparing a self-healing block copolymer containing a styrene-based compound polymerized at the end of the self-healing random copolymer by stabilizing and copolymerizing the second mixed solution.

8. The method of preparing a self-healing block copolymer of claim 7, wherein in the step of preparing the self-healing random copolymer, an initiator, a catalyst, and a ligand are added to the first mixed solution, followed by stabilization and copolymerization.

9. The method of preparing a self-healing block copolymer of claim 7, wherein in the step of preparing the self-healing block copolymer, a catalyst and a ligand are added to the second mixed solution, followed by stabilization and copolymerization.

10. The method of preparing a self-healing block copolymer of claim 7, further comprising the step of, after copolymerization of the first mixed solution or the second mixed solution, precipitating the copolymerized first mixed solution or second mixed solution in hexane.

11. The method of preparing a self-healing block copolymer of claim 7, wherein the amount of the styrene-based compound contained in the second mixed solution is 65 wt % or less with respect to the total weight of the first mixed solution.

12. The method of preparing a self-healing block copolymer of claim 7, wherein the self-healing block copolymer is prepared at a temperature ranging from 60° C. to 120° C.

13. A self-healing block copolymer film comprising:

a self-healing random copolymer; and a self-healing block copolymer containing a styrene-based compound polymerized at the end of the self-healing random copolymer, wherein the self-healing random copolymer is a random copolymer comprising:

a first monomer that is a methacrylate-based compound;

a second monomer that is an acrylate-based compound; and a third monomer that is N-2-(phthalimido ethyl methacrylate) (NPEMA), phenyl methacrylate (PMA) or N-(4-hydroxyphenyl)methacrylamide (HPMMA).

14. The self-healing block copolymer film of claim 13, wherein the self-healing block copolymer film has a tensile strength of 70 MPa to 350 MPa and a Young's modulus of 1,500 MPa to 20,000 MPa.

15. The self-healing block copolymer film of claim 13, wherein the self-healing block copolymer film self-heals at a temperature ranging from 40° C. to 100° C.

* * * * *